(12) United States Patent
Kishikawa et al.

(10) Patent No.: US 11,411,681 B2
(45) Date of Patent: *Aug. 9, 2022

(54) IN-VEHICLE INFORMATION PROCESSING FOR UNAUTHORIZED DATA

(71) Applicant: PANASONIC INTELLECTUAL PROPERTY CORPORATION OF AMERICA, Torrance, CA (US)

(72) Inventors: Takeshi Kishikawa, Osaka (JP); Tatsumi Oba, Osaka (JP); Manabu Maeda, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 17/128,542

(22) Filed: Dec. 21, 2020

(65) Prior Publication Data

US 2021/0152287 A1 May 20, 2021

Related U.S. Application Data

(63) Continuation of application No. 16/237,327, filed on Dec. 31, 2018, now Pat. No. 10,911,182, which is a (Continued)

(30) Foreign Application Priority Data

Mar. 13, 2017 (JP) .............................. JP2017-047636
Dec. 26, 2017 (JP) .............................. JP2017-248858

(51) Int. Cl.
*H04L 1/00* (2006.01)
*H04L 1/16* (2006.01)
(Continued)

(52) U.S. Cl.
CPC .......... *H04L 1/0091* (2013.01); *G06K 9/6269* (2013.01); *G07C 5/085* (2013.01);
(Continued)

(58) Field of Classification Search
CPC ..... H04W 76/15; H04W 76/00; H04W 76/40; H04W 40/24; H04W 40/00; H04W 72/00;
(Continued)

(56) References Cited

U.S. PATENT DOCUMENTS 5,850,515 A * 12/1998 Lo ....................... H04L 63/1441
714/49
10,095,859 B2 * 10/2018 Miyake ................. H04L 9/3228
(Continued)

FOREIGN PATENT DOCUMENTS

| JP | 2014-146868 | 8/2014 |
| JP | 2016-134913 A | 7/2016 |
| WO | 2013/094072 | 6/2013 |

OTHER PUBLICATIONS

The Extended European Search Report from the European Patent Office (EPO) dated Dec. 18, 2019 for the related European Patent Application No. 18768478.2.
(Continued)

*Primary Examiner* — Warner Wong
(74) *Attorney, Agent, or Firm* — Greenblum & Bernstein, P.L.C.

(57) ABSTRACT

An information processing method performed by an information processing system including a storage device to process a plurality of data frames flowing in an in-vehicle network including at least one electronic control unit includes a receiving step of sequentially receiving a plurality of data frames flowing in the in-vehicle network, a frame collection step of recording, in a reception log held in the storage device, reception interval information indicating
(Continued)

reception intervals between the plurality of data frames as frame information, a feature acquisition step of acquiring, from the reception interval information, a feature relating to distribution of the reception intervals between the plurality of data frames, and an unauthorized data presence determination step of determining the presence/absence of an unauthorized data frame among the plurality of data frames.

15 Claims, 11 Drawing Sheets

Related U.S. Application Data continuation of application No. PCT/JP2018/004781, filed on Feb. 13, 2018.

(51) Int. Cl.
*G07C 5/08* (2006.01)
*G06K 9/62* (2022.01)
*H04L 1/24* (2006.01)
*H04W 40/24* (2009.01)
*H04L 45/02* (2022.01)
*H04W 76/40* (2018.01)
*H04L 9/32* (2006.01)

(52) U.S. Cl.
CPC .......... *G07C 5/0808* (2013.01); *H04L 1/1678* (2013.01); *H04L 1/248* (2013.01); *H04L 9/32* (2013.01); *H04L 45/04* (2013.01); *H04W 40/24* (2013.01); *H04W 76/40* (2018.02)

(58) Field of Classification Search
CPC ........ H04W 28/00; H04L 41/12; H04L 41/08; H04L 41/0806; H04L 41/00; H04L 12/2859
See application file for complete search history.

(56) References Cited

U.S. PATENT DOCUMENTS

| | | | |
|---|---|---|---|
| 2010/0057292 A1* | 3/2010 | Ishikawa | G07C 5/085 701/31.4 |
| 2010/0299725 A1* | 11/2010 | Yamada | H04W 12/122 726/4 |
| 2013/0227648 A1 | 8/2013 | Ricci | |
| 2014/0040992 A1 | 2/2014 | Koide et al. | |
| 2014/0328352 A1 | 11/2014 | Mabuchi et al. | |
| 2015/0066239 A1 | 3/2015 | Mabuchi | |
| 2015/0095997 A1 | 4/2015 | Mabuchi | |
| 2015/0215125 A1* | 7/2015 | Park | H04L 9/065 380/255 |
| 2015/0302198 A1 | 10/2015 | Payne et al. | |
| 2015/0350176 A1* | 12/2015 | Mabuchi | H04L 9/3271 726/6 |
| 2015/0358351 A1 | 12/2015 | Otsuka et al. | |
| 2016/0065594 A1 | 3/2016 | Srivastava et al. | |
| 2016/0142410 A1 | 5/2016 | Mazzara, Jr. | |
| 2016/0147702 A1* | 5/2016 | Yajima | G06F 13/4221 710/105 |
| 2016/0224806 A1 | 8/2016 | Takada et al. | |
| 2016/0264071 A1* | 9/2016 | Ujiie | H04L 63/067 |
| 2016/0323287 A1 | 11/2016 | Kishikawa et al. | |
| 2016/0359893 A1 | 12/2016 | Kishikawa et al. | |
| 2017/0093866 A1 | 3/2017 | Ben-Noon et al. | |
| 2017/0111177 A1 | 4/2017 | Oguma et al. | |
| 2017/0142137 A1 | 5/2017 | Xia et al. | |
| 2018/0069874 A1 | 3/2018 | Saeki et al. | |
| 2018/0115567 A1 | 4/2018 | El-Moussa et al. | |
| 2018/0144119 A1 | 5/2018 | Kishikawa et al. | |
| 2018/0288000 A1 | 10/2018 | Inoue | |
| 2018/0302422 A1 | 10/2018 | Kishikawa et al. | |
| 2018/0375881 A1 | 12/2018 | Wada et al. | |
| 2019/0068715 A1* | 2/2019 | Kishikawa | H04L 63/20 |
| 2019/0104149 A1 | 4/2019 | Zeng et al. | |
| 2019/0152287 A1* | 5/2019 | Ajisaka | B60H 1/00885 |
| 2019/0173902 A1 | 6/2019 | Takahashi et al. | |
| 2019/0273755 A1 | 9/2019 | Atsumi | |
| 2019/0334897 A1 | 10/2019 | Anzai et al. | |
| 2020/0014758 A1 | 1/2020 | Kamiguchi et al. | |
| 2020/0015075 A1 | 1/2020 | Takatsuka | |
| 2020/0151972 A1 | 5/2020 | Nakajima et al. | |
| 2020/0213340 A1 | 7/2020 | Hamada | |
| 2020/0233019 A1 | 7/2020 | Atobe | |

OTHER PUBLICATIONS

International Search Report of PCT application No. PCT/JP2018/004781 dated May 15, 2018.

* cited by examiner

FIG. 5

| RECEPTION TIME (μs) | ID | DATA VALUE (hex) | REFERENCE | GROUP |
|---|---|---|---|---|
| 50,250 | 0x100 | 00 00 | 0 | 0 |
| 99,700 | 0x100 | 00 10 | 0 | 0 |
| 150,560 | 0x100 | 00 1A | 1 | 0 |

FIG. 6

| ID | VARIANCE |
|---|---|
| 0x100 | 250000 |

FIG. 7

| ID | RECEPTION INTERVAL (μs) | | DATA VARIATION MARGIN |
|---|---|---|---|
| | AVERAGE | MARGIN | |
| 0x100 | 50,000 | 3,000 | 100 (1 km/h) |

| ID | DLC | DATA FIELD (hex) |
|---|---|---|
| 0x100 | 2 | 15 4B |

| RECEPTION TIME (μs) | ID | DATA VALUE (hex) | REFERENCE | GROUP |
|---|---|---|---|---|
| 50,250 | 0x100 | 15 4B (54.51 km/h) | 0 | 0 |
| 99,700 | 0x100 | 15 57 (54.63 km/h) | 1 | 1 |
| 100,500 | 0x100 | 15 40 (54.40 km/h) | 1 | 2 |

| RECEPTION TIME (μs) | ID | DATA VALUE (hex) | REFERENCE | GROUP |
|---|---|---|---|---|
| 50,250 | 0x100 | 15 4B (54.51 km/h) | 0 | 0 |
| 99,700 | 0x100 | 15 57 (54.63 km/h) | 1 | 1 |
| 100,500 | 0x100 | 15 40 (54.40 km/h) | 1 | 2 |
| 150,550 | 0x100 | 15 70 (54.88 km/h) | 0 | 1 |
| 151,000 | 0x100 | 15 30 (54.24 km/h) | 0 | 2 |

| RECEPTION TIME (μs) | ID | DATA (hex) | REFERENCE | GROUP |
|---|---|---|---|---|
| 50,250 | 0x100 | 15 4B (54.51 km/h) | 0 | 0 |
| 99,700 | 0x100 | 15 57 (54.63 km/h) | 0 | 1 |
| 100,500 | 0x100 | 15 40 (54.40 km/h) | 0 | 2 |
| 150,550 | 0x100 | 15 70 (54.88 km/h) | 0 | 1 |
| 151,000 | 0x100 | 15 30 (54.24 km/h) | 0 | 2 |
| ⋮ | ⋮ | ⋮ | ⋮ | ⋮ |
| 1,000,500 | 0x100 | 17 60 (59.84 km/h) | 1 | 1 |
| 1,001,100 | 0x100 | 13 98 (50.16 km/h) | 1 | 2 |
| 1,049,600 | 0x100 | 17 70 (60.00 km/h) | 0 | 1 |
| 1,050,200 | 0x100 | 13 88 (50.00 km/h) | 0 | 2 |

| GROUP 1 | GROUP 2 |
|---|---|
| 300000 | 400000 |

IN-VEHICLE INFORMATION PROCESSING FOR UNAUTHORIZED DATA

This is a continuation of U.S. patent application Ser. No. 16/237,327, filed Dec. 31, 2018, which is a continuation of International Patent Appl. No. PCT/JP2018/004781, filed Feb. 13, 2018, which claims priority to Japanese Patent Appl. No. 2017-248858, filed Dec. 26, 2017, and to Japanese Patent Appl. No. 2017-047636, filed Mar. 13, 2017. The entire disclosure of each of the above-identified documents, including the specification, drawings, and claims, is incorporated herein by reference in its entirety.

BACKGROUND

1. Technical Field

The present disclosure relates to a technique for processing data flowing in an in-vehicle network.

2. Description of the Related Art

In recent years, a system in an automobile has had a plurality of devices called electronic control units (hereinafter referred to as "ECUs") disposed therein. A network connecting these ECUs with one another is called an in-vehicle network. A plurality of communication standards have been developed for the in-vehicle network. Among them, the Control Area Network (hereinafter referred to as "CAN") is one of the most mainstream in-vehicle network standards.

SUMMARY

In the CAN communication network, two buses are used as communication lines, and ECUs each connected to the buses are called nodes. Each of the nodes connected to the buses transmits and receives a message called a frame. A node that transmits a frame (hereinafter also referred to as a transmitting node) applies voltages to two buses and transmits a value of "1" (called "recessive") and a value of "0" (called "dominant") which correspond to the presence and absence of a potential difference between the two buses, respectively. In this manner, the transmitting node transmits the binary data of the frame.

When a plurality of transmitting nodes attempt to transmit recessive and dominant at exactly the same time, the dominant has higher priority and, thus, the dominant is transmitted.

If the format of a received frame is abnormal, a receiving node transmits a frame called an error frame. An error frame is a frame starting with, for example, consecutive 6 bits of dominant. Upon receiving the error frame, the transmitting node and other receiving nodes detect the occurrence of an error.

In addition, in CAN, an identifier indicating a transmission destination or a transmission source is not provided, and the transmission node adds an ID indicating, for example, the type of data to each of the frames. Each of the receiving nodes receives only a frame including a predetermined ID. Furthermore, in CAN, the CSMA/CR (Carrier Sense Multiple Access/Collision Resolution) technique is adopted, and arbitration is performed by using the IDs when a plurality of nodes transmit frames at the same time. At this time, a frame having a smaller ID value is transmitted first.

In addition, the CAN faces a threat to unauthorized control over an ECU by an attacker who accesses the CAN bus and transmits an unauthorized frame. Accordingly, security measures are being planned.

For example, Japanese Patent No. 5664799 describes a CAN frame monitoring function for monitoring the communication state of a CAN network. More specifically, according to Japanese Patent No. 5664799, it is detected whether a frame is transmitted to the network at predefined communication intervals. By determining that a frame transmitted outside the predefined communication interval is an unauthorized frame, control using an unauthorized frame is prevented.

In addition, Japanese Unexamined Patent Application Publication No. 2014-146868 describes a technique for determining whether an unauthorized event has occurred. In the technique, if the communication interval between frames is shorter than a prescribed communication interval, it is determined whether a frame having the same identifier is subsequently received before a predetermined period of time elapses. If a frame having the same identifier is received within the predetermined period of time, it is determined that an unauthorized event has occurred.

SUMMARY

In one general aspect, the techniques disclosed here feature an information processing method, performed by an information processing system including a storage device, for processing a data frame flowing in an in-vehicle network. The method includes a receiving step of sequentially receiving a plurality of data frames flowing in the in-vehicle network, a frame collection step of recording, in a reception log held in the storage device, reception interval information indicating reception intervals between the plurality of data frames as frame information, a feature acquisition step of acquiring, from the reception interval information, a feature relating to distribution of the reception intervals between the plurality of data frames, and an unauthorized data presence determination step of determining the presence/absence of an unauthorized data frame among the plurality of data frames.

The information processing method and the like according to the present disclosure can more appropriately detect an unauthorized frame and, thus, provide a more secure in-vehicle network system.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 illustrates an example of the data structure of a reception log held by a reception log holding unit of the monitoring ECU according to the embodiment;

FIG. 6 illustrates an example of the data structure of a normal model held by a normal model holding unit of the monitoring ECU according to the embodiment;

FIG. 7 illustrates an example of the data structure of a rule held by a rule holding unit of a monitoring ECU according to the embodiment;

DETAILED DESCRIPTION

Figure 1:
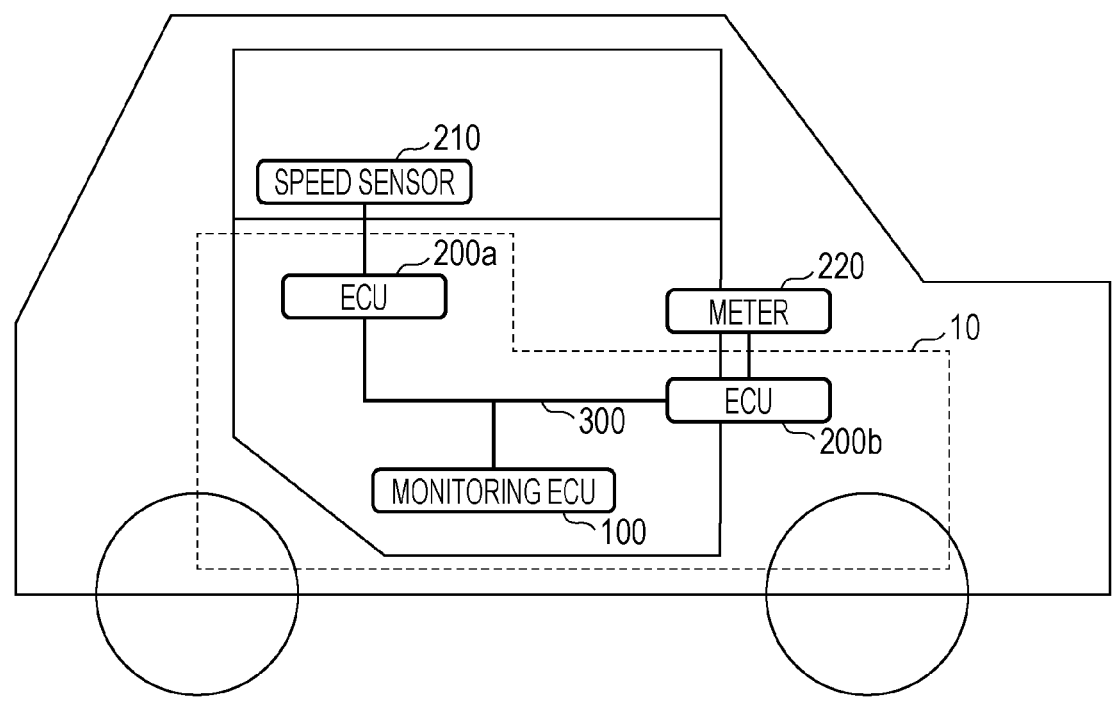
FIG. 1 is a block diagram illustrating the architecture of an in-vehicle network system according to an embodiment.

In the CAN frame monitoring function as described in Japanese Patent No. 5664799, an unauthorized frame that conforms to the prescribed communication interval is determined to be a normal frame. In addition, according to the unauthorized event determination method as described in Japanese Unexamined Patent Application Publication No. 2014-146868, when it is determined that an unauthorized event has occurred, it cannot be determined which one of the two received frames is unauthorized.

The present disclosure provides an information processing method and the like capable of achieving a safer in-vehicle network system by more adequately detecting an unauthorized frame.

According to an aspect of the present disclosure, an information processing method, performed by an information processing system including a storage device, for processing a data frame flowing in an in-vehicle network is provided. The method includes a receiving step of sequentially receiving a plurality of data frames flowing in the in-vehicle network, a frame collection step of recording, in a reception log held in the storage device, reception interval information indicating reception intervals between the plurality of data frames as frame information, a feature acquisition step of acquiring, from the reception interval information, a feature relating to distribution of the reception intervals between the plurality of data frames, and an unauthorized data presence determination step of determining the presence/absence of an unauthorized data frame among the plurality of data frames.

As a result, detection of transmission of an unauthorized data frame from an attacker is accomplished by using the feature that is difficult for the attacker to control. That is, it is difficult for the attacker to evade countermeasures against unauthorized event. Consequently, the in-vehicle network can be more reliably protected.

In addition, a normal model indicating the property of a normal frame may be further stored in the storage device. In the unauthorized data presence determination step, the presence/absence of an unauthorized data frame among the plurality of data frames may be determined by using the feature obtained by using the reception interval information and the normal model.

In this manner, the presence/absence of an unauthorized data frame can be determined on the basis of the magnitude of the difference between the feature relating to the distribution of normal data frame reception intervals and the feature relating to the distribution of unauthorized data frame reception intervals. Thus, even for a group of data frames that was previously difficult to determine whether it is unauthorized, the determination can be made more accurately.

For example, the normal model may indicate reception intervals between normal data frames as the property. The feature acquired in the feature acquisition step is an anomaly score of the reception intervals between the plurality of received data frames, and the anomaly score is calculated by using density ratio estimation between the reception intervals between the received data frames and the reception intervals between normal data frames indicated by the normal model. In the unauthorized data presence determination step, it may be determined whether an unauthorized data frame is present among the plurality of data frames on the basis of the anomaly score.

In this manner, it is possible to detect the difference in probability distribution between the reception intervals between the normal data frames and the reception intervals between the actually received data frames. Thus, the presence or absence of an unauthorized data frame can be determined. Even for a group of data frames that was previously difficult to determine whether it is unauthorized, the determination can be made more accurately.

In addition, for example, the normal model may indicate a variance of the reception intervals between normal data frames as the property. The feature acquired in the feature acquisition step may be a variance of the reception intervals between the plurality of received data frames. In the unauthorized data presence determination step, the difference between the variance of the reception intervals between normal data frames and the variance of the reception intervals may be calculated, and it may be determined whether an unauthorized data frame is present among the plurality of data frames on the basis of a magnitude of the difference.

In this manner, an unauthorized data frame can be detected on the basis of the statistical difference in reception interval between normal data frames and unauthorized data frames. Thus, even for a data frame that was previously difficult to determine whether it is authorized or unauthorized, the determination can be made more accurately. As a result, the in-vehicle network can be protected.

In addition, the frame information may further include a data value included in each of the plurality of data frames in association with the reception interval information. The method may further include a grouping step of setting at least one group including at least some of the plurality of data frames on the basis of the reception interval information and the data values included in the frame information. In the feature acquisition step, a feature relating to distribution of the reception intervals between the plurality of data frames included in each of the at least one group may be acquired from the reception interval information included in the reception log. In the unauthorized data presence determination step, a group including an unauthorized data frame and a group not including an unauthorized data frame may be identified among the at least one group on the basis of at least the feature obtained for each of the at least one group.

In existing methods, if a plurality of data frames are received within the prescribed range of the communication interval, it is difficult to determine whether an unauthorized data frame is present among these data frames. Even in such a case, a group can be identified whether it is a group including an unauthorized data frame or a group not including an unauthorized data frame in the above-described manner. Consequently, the in-vehicle network can be more reliably protected.

In addition, the method may further include a data frame determination step of determining whether a data frame received in the reception step performed after each of the at least one group is identified in the unauthorized data presence determination step is a normal data frame or an unauthorized data frame by determining whether the data frame belongs to the identified group.

As a result, it is possible to perform filtering through determination as to whether each of the data frames is a normal data frame or an unauthorized data frame.

In addition, the storage device may further hold a reception interval rule which is a rule relating to a reception interval between data frames and a data variation rule which is a rule relating to a temporal variation of a data value included in a data frame. In the grouping step, the at least one group may be set up on the basis of the reception interval information, the data value, the reception interval rule, and the data variation rule. If the number of data frames included in each of the at least one group is greater than or equal to a predetermined number, the unauthorized data presence determination step may be performed on the at least one group. Alternatively, the storage device may further hold a reception interval rule which is a rule relating to a reception interval between data frames and a data variation rule which is a rule relating to a temporal variation of a data value included in a normal data frame. In the grouping step, a plurality of groups may be set up for the plurality of data frames on the basis of the reception interval information, the data value, the reception interval rule, and the data variation rule. If a difference between averages of the data values of data frames included in the plurality of groups is greater than or equal to a predetermined value, the unauthorized data presence determination step may be performed on the plurality of groups. Furthermore, the data variation rule may state that a temporal variation of the data value included in the data frame should be less than or equal to a predetermined value.

In this manner, a group can be accurately set for each of the plurality of data frames, and determination of the presence or absence of an unauthorized data frame which was previously difficult can be made. As a result, the in-vehicle network can be more reliably protected.

In addition, the storage device may further hold an autoregressive coefficient obtained from time-series data of the reception intervals between normal frames. The at least one group set in the grouping step may include a plurality of groups. The feature relating to the reception intervals between a plurality of data frames included in each of the plurality of groups may be a predicted reception interval predicted by using the reception interval information. In the feature acquisition step, a predicted reception interval may be acquired as the feature relating to the reception intervals between a plurality of data frames included in each of the plurality of groups by using the autoregressive coefficient and the frame information. In the unauthorized data presence determination step, calculation may be performed for each of the plurality of groups to obtain a prediction error which is an error between the predicted reception interval and an actual reception interval for the most recent data frame included in the group, and a group having the smallest prediction error among the plurality of groups may be identified as a group not including an unauthorized data frame.

In this manner, it is possible to identify a group not including an unauthorized data frame by using the fitness of the reception interval between normal data frames and the reception interval between unauthorized data frames to the time-series model. As a result, the in-vehicle network can be more reliably protected.

In addition, in the unauthorized data presence determination step, a group including an unauthorized data frame and a group not including an unauthorized data frame may be identified among the plurality of groups by using a classifier that has learned a reception interval vector of a normal data frame and a reception interval vector of an unauthorized data frame. Furthermore, the classifier may be configured by using at least one of Random Forest, Support Vector Machine, NN (Nearest Neighbor), and Neural Network.

In this manner, by using the classifier that has learned a reception interval vector of a normal frame and a reception interval vector of an unauthorized data frame, a group including an unauthorized data frame can be more accurately identified than before. As a result, the in-vehicle network can be more reliably protected.

According to an aspect of the present disclosure, an information processing system for processing a data frame flowing in an in-vehicle network including at least one electronic control unit is provided. The system includes a processor and a storage device. The processor sequentially receives a plurality of data frames flowing in the in-vehicle network. The processor records, in a reception log held in the storage device, reception interval information indicating reception intervals between the plurality of data frames as frame information. The processor acquires, from the reception interval information, a feature relating to distribution of the reception intervals between the plurality of data frames. The processor determines the presence/absence of an unauthorized data frame among the plurality of data frames. Alternatively, according to another aspect of the present disclosure, a program includes program code causing a processor in an information processing system including the processor and a storage device to perform the information processing method according to the present disclosure.

As a result, detection of transmission of an unauthorized data frame from an attacker is accomplished by using the feature that is difficult for the attacker to control. That is, it is difficult for the attacker to evade countermeasures against unauthorized event. Consequently, the in-vehicle network can be more reliably protected.

Embodiments are described below with reference to the accompanying drawings. Note that each of the embodiments described below is a general or specific example of the present disclosure. Accordingly, a value, a shape, a material, a constituent element, the positions and the connection form of the constituent elements, steps, and the sequence of steps described in the embodiments are only examples and shall not be construed as limiting the scope of the present disclosure. In addition, among the constituent elements in the embodiments described below, the constituent element that does not appear in an independent claim, which has the broadest scope, is described as an optional constituent element.

EMBODIMENTS

1. System Configuration

An information processing system described as an embodiment is an information processing system including a processor and a storage device. The information processing system processes data frames flowing in an in-vehicle network including at least one electronic control unit. The processor sequentially receives a plurality of data frames flowing in the in-vehicle network and stores, in a reception log held in the storage device, reception interval information indicating a reception interval between the data frames as frame information. In addition, the processor acquires, from the recorded reception interval information, the feature relating to the distribution of reception intervals among a plurality of data frames and uses the acquired feature to determine the presence/absence of an unauthorized data frame among the plurality of data frames. According to the present embodiment, a plurality of data frames having a common identifier (ID), which indicates a type, are classified into two categories (groups).

A monitoring ECU connected to the in-vehicle network is described below with reference to the accompanying drawings as an example of the information processing system according to the present embodiment.

1.1 Architecture of in-Vehicle Network System

FIG. 1 is a block diagram illustrating the architecture of an in-vehicle network system according to the present embodiment. As illustrated in FIG. 1, the in-vehicle network system 10 includes a monitoring ECU 100, an ECU 200*a*, an ECU 200*b*, and a bus 300.

The monitoring ECU 100 is connected to the bus 300. The monitoring ECU 100 monitors data frames flowing on the bus 300 and monitors whether an unauthorized data frame is flowing. The monitoring ECU 100 is an example of an information processing system according to this embodiment. The monitoring ECU 100 includes a microcontroller (not illustrated) including a communication circuit, a processor, and a memory.

The ECU 200*a* is connected to the bus 300 and is further connected to a speed sensor 210. The ECU 200*a* periodically set, in a data frame, the speed of the vehicle obtained from the speed sensor 210 and transmits the data frame to the bus 300.

The ECU 200*b* is connected to the bus 300 and is further connected to a meter 220. The ECU 200*b* acquires the data frame including the speed of the vehicle and transmitted from the ECU 200*a* to the bus 300. Thereafter, the ECU 200*b* causes the meter 220 to display the speed of the vehicle acquired from the data frame.

1.2 Data Frame Format

Figure 2:
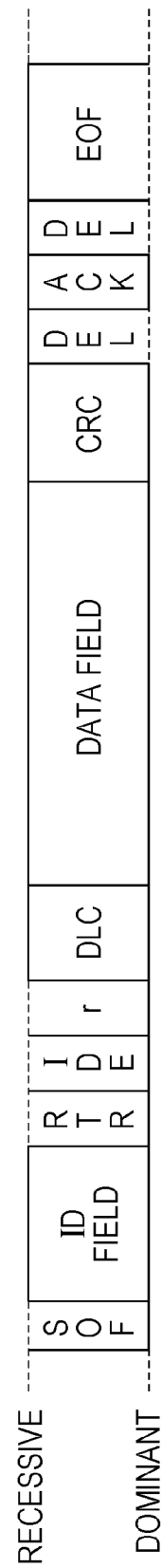
FIG. 2 illustrates the data frame format of the CAN protocol.

FIG. 2 illustrates the data frame format defined by the CAN protocol. In FIG. 2, the data frame of the standard ID format defined by the CAN protocol is illustrated.

In FIG. 2, the data frame includes Start Of Frame (hereinafter referred to as "SOF"), an ID field, Remote Transmission Request (hereinafter referred to as "RTR"), IDentifier Extension (hereinafter referred to as "IDE"), a reserved bit (hereinafter referred to as "r"), data length code (hereinafter referred to as "DLC"), a data field, a Cyclic Redundancy Check (Hereinafter referred to as "CRC") sequence, a CRC delimiter (the left DEL in the figure), an acknowledgment (hereinafter referred to as "ACK") slot, an ACK delimiter (the right DEL in the figure), and an end of frame (hereinafter referred to as "EOF").

SOF consists of a 1-bit dominant. When the bus 300 is idle, the bus 300 is recessive. The transmitting node sends a notification message indicating the start of frame transmission by changing the bus 300 from recessive to dominant.

The ID is an 11-bit length value. The ID indicates the type of data frame. Examples of the type of data frame as used herein include the content of the data or the transmission node which is the transmission source of the data frame. In addition, the ID is used for communication arbitration between data frames for which a plurality of nodes simultaneously start transmission over the same network. More specifically, a data frame having a smaller ID value has a higher priority.

RTR is a 1-bit length dominant and indicates that the frame is a data frame.

Each of IDE and r consists of a 1-bit length dominant.

DLC is a 4-bit length value and indicates the length of the data field that follows the DLC.

The data field is a portion of the transmitted data that is up to 64 bits in length. The data field is the payload of the data frame. The length can be adjusted in 8-bit increments. The specification regarding allocation of data to be transmitted to this portion depends on the vehicle type and the manufacturer.

The CRC sequence is 15 bits in length. The CRC sequence indicates a value calculated by using the transmission values in the SOF, ID field, control field, and data field. The receiving node compares the result calculated by using the reception values of the SOF, ID field, control field, and data field with the value of the CRC sequence for each of the data frames. Thus, the receiving node determines the presence or absence of abnormality.

The CRC delimiter consists of a 1-bit length recessive. The CRC delimiter serves as a delimiter indicating the end of the CRC sequence.

The ACK slot is 1 bit in length. The transmitting node transmits recessive by using this portion. If the receiving node has successfully received a frame up to the CRC sequence, the receiving node transmits a dominant in this portion. In the CAN standard, as described above, dominant has a higher priority over recessive if the dominant and recessive are transmitted at the same time. Therefore, in the in-vehicle network system 10 in which communication is normally performed, the bus 300 is in a dominant state while the ACK slot is being transmitted.

The ACK delimiter consists of a 1-bit length recessive. The ACK delimiter serves as a delimiter indicating the end of the ACK slot.

The EOF consists of a 7-bit length recessive. The EOF indicates the end of a data frame.

1.3 Error Frame Format

Figure 3:
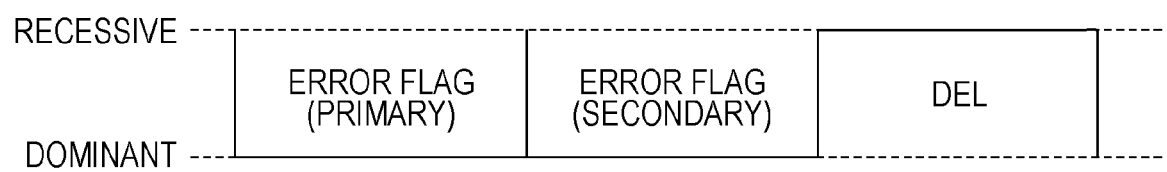
FIG. 3 illustrates an error frame format of the CAN protocol.

FIG. 3 illustrates the format of an error frame defined by the CAN protocol. In FIG. 3, the error frame consists of three portions: an error flag (primary), an error flag (secondary), and an error delimiter (DEL in the figure).

The error flag (primary) is used to inform other nodes of the occurrence of an error. The error flag consists of 6 consecutive dominant bits, which violate the bit stuffing rule defined by the CAN protocol. The bit stuffing rule states that after consecutive 5 bits of the same value, 1 bit of a different value needs to be transmitted. The occurrence of violation of the bit stuffing rule causes transmission of an error flag (secondary) from other nodes.

The error flag (secondary) consists of a 6-bit length dominant. The error flag (secondary) is sent to notify other nodes of the occurrence of an error. All the nodes that have received the error flag (primary) transmit the error flag (secondary).

The error delimiter (DEL) consists of an 8-bit length recessive. The error delimiter indicates the end of the error frame.

1.4 Configuration of Monitoring ECU

Figure 4:
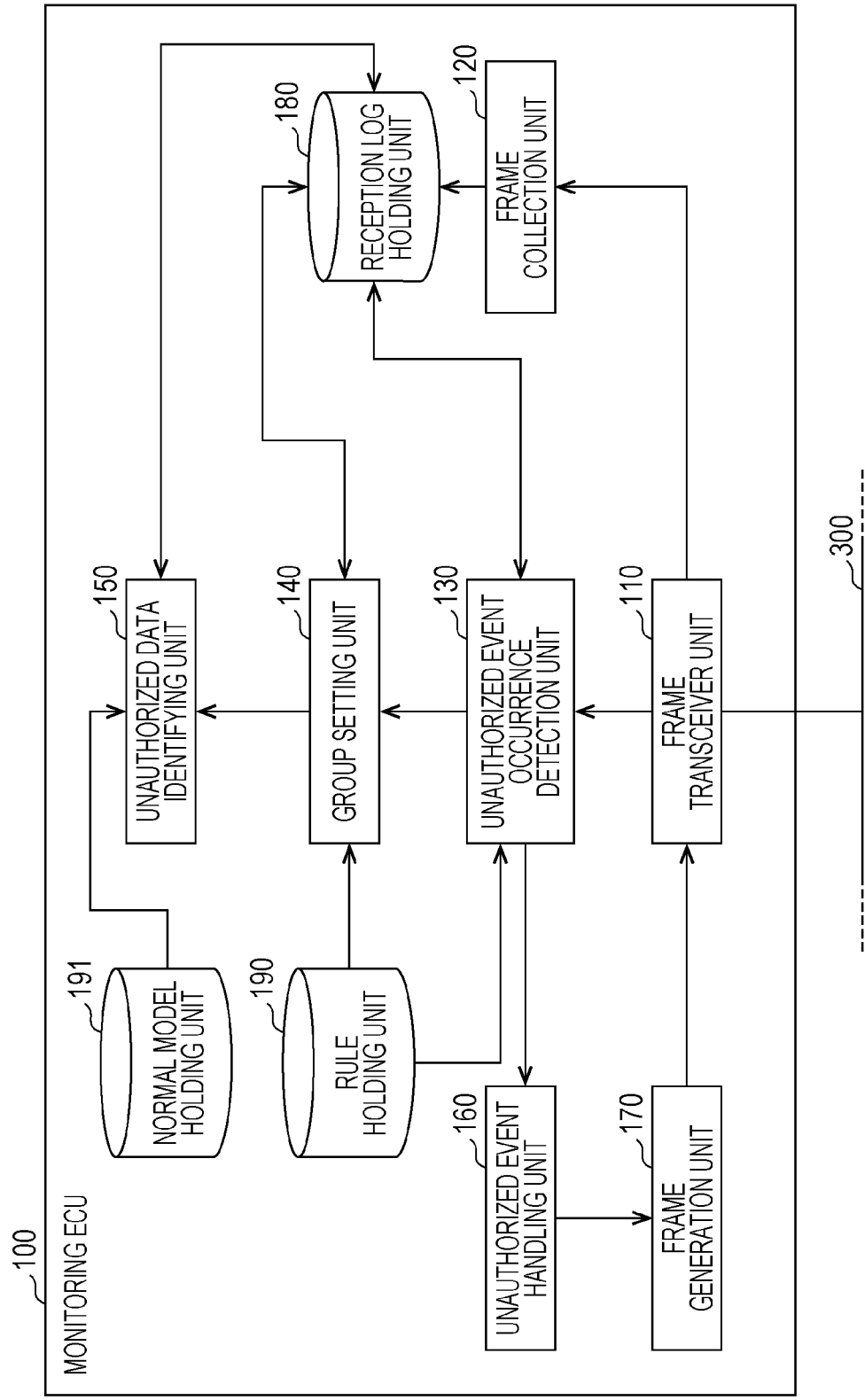
FIG. 4 is a block diagram of the functional configuration of a monitoring ECU according to the embodiment.

FIG. 4 is a block diagram of the functional configuration of the monitoring ECU according to the present embodiment. As illustrated in FIG. 4, the monitoring ECU 100 includes a frame transceiver unit 110, a frame collection unit 120, an unauthorized event occurrence detection unit 130, a group setting unit 140, an unauthorized data identifying unit 150, an unauthorized event handling unit 160, a frame generation unit 170, a reception log holding unit 180, a rule holding unit 190, and a normal model holding unit 191.

The frame transceiver unit 110 transmits and receives, to and from the bus 300, data frames according to the CAN protocol. That is, the frame transceiver unit 110 sequentially receives a plurality of data frames by receiving the data frames bit by bit from the bus 300 which constitutes the in-vehicle network system 10 (a receiving step). If reception of each data frame is completed without any error, the frame transceiver unit 110 transfers the ID, DLC, and data field, which are portions of the data frame, to the frame collection unit 120 and the unauthorized event occurrence detection unit 130.

If the frame transceiver unit 110 determines that the received data frame does not conform to the CAN protocol, the frame transceiver unit 110 transmits an error frame described above in FIG. 3.

In addition, if the frame transceiver unit 110 receives an error frame from another node, that is, if the frame transceiver unit 110 determines that the received frame is an error frame from the value of the frame, the frame transceiver unit 110 discards the frame thereafter.

In addition, upon receiving a data frame transmission request from the frame generation unit 170, the frame transceiver unit 110 transmits the data frame to the bus 300 bit by bit.

The frame collection unit 120 receives the above-mentioned portions of the data frame from the frame transceiver unit 110 and records the time at which this data frame was received (hereinafter referred to as a "reception time") and the ID and data field included in the data frame as a record of a reception log held in the reception log holding unit 180 (a frame collection step). Hereinafter, the information about each data frame recorded in the record in this manner is also referred to as "frame information". The reception time is an example of reception interval information according to the present embodiment. The reception time of the data frame is a time obtained by referring to the timer that measures the time elapsed since the monitoring ECU 100 was activated. Such a timer is included in, for example, the microcontroller included in the monitoring ECU 100.

The unauthorized event occurrence detection unit 130 determines whether an unauthorized event has occurred by using the reception log stored in the reception log holding unit 180 and the rule stored in the rule holding unit 190 and, more specifically, a rule related to the reception interval of a data frame (hereinafter referred to as a "reception interval rule"). For example, the reception interval rule is determined for each of the IDs in accordance with the specification of the in-vehicle network system 10.

More specifically, the unauthorized event occurrence detection unit 130 refers to the reception log retained in the reception log holding unit 180 and acquires the reception intervals between the data frames each having the common ID. Thereafter, the unauthorized event occurrence detection unit 130 determines whether an unauthorized event has occurred by using the average and the margin of the reception intervals of the ID, which are the reception interval rule held in the rule holding unit 190.

FIG. 5 illustrates an example of the data structure of the reception log held by the reception log holding unit 180 of the monitoring ECU 100 according to the present embodiment. In this example, records (or frame information) of three data frames each having an ID of 0x100 are stored in the reception log.

The reception log includes information about each of the data frames sent from the frame collection unit 120 and, more specifically, the reception time, the ID, the data field value (hereinafter also referred to as a "data value"), the reference, and the group.

In this example, the reception time of the oldest data frame in the stored information of the three data frames is 50,250 μs, and the value of the data field is 0x00 0x00. In addition, the reception time of the most recent data frame is 150,560 μs, and the value of the data field is 0x00 0x1A. The reception log has a "reference" field. The value in this field indicates whether the reception time or data value of the data frame is used as a reference for determination of the presence or absence of an unauthorized data frame in a series of processes. In this example, a data frame whose value in the "reference" field is 1 is used as such a reference.

For example, the unauthorized event occurrence detection unit 130 determines whether each of the data frames whose frame information is recorded in the reception log stored in the reception log holding unit 180 conforms to the reception interval rule. In this determination, for example, a value obtained by adding a predetermined average of reception intervals to the reception time of the data frame whose value in the reference field is 1 among the data frames of the ID to be determined is used as the assumed next reception time. Among the data frames of the same ID received after the data frame, the unauthorized event occurrence detection unit 130 determines one having a reception time within the range of a value obtained by subtracting the margin of the reception interval from the assumed next reception time to a value obtained by adding the margin of the reception interval to the assumed next reception time (inclusive) as being a data frame that conforms to the reception interval rule.

If there is one data frame that conforms to the reception interval rule for the assumed next reception time and if the current time is greater than the value obtained by adding the margin of the reception interval to the assumed next reception time, the unauthorized event occurrence detection unit 130 changes the value in the reference field of the data frame determined to conform to the reception interval rule to 1.

If there are two or more data frames that conform to the reception interval rule, the unauthorized event occurrence detection unit 130 determines whether the data value of each of the data frames that conform to the reception interval rule conforms to a data variation rule stored in the rule holding unit 190. In this determination, if, for example, the data value is less than or equal to the value obtained by adding a predetermined margin of the data variation to the data value of the data frame whose value in the above-mentioned reference field is 1 and is greater than or equal to the value obtained by subtracting the margin of the data variation from the data value, the unauthorized event occurrence detection unit 130 determines that the data frame is a data frame that conforms to the rule relating to data variation (hereinafter referred to as a "data variation rule"). Subsequently, if there are two or more data frames that conform to the data variation rule, the unauthorized event occurrence detection unit 130 determines that an unauthorized event has occurred. The data variation rule is a rule relating to the temporal variation of the data value included in the data frame. The data variation rule states that the temporal variation of the data value included in the data frame should be less than or equal to a predetermined value. The predetermined value is set based on, for example, the specification of the in-vehicle network system 10.

If the unauthorized event occurrence detection unit 130 determines that an unauthorized event has occurred, the unauthorized event occurrence detection unit 130 notifies the group setting unit 140 and the unauthorized event handling unit 160 of the occurrence of an unauthorized event.

Furthermore, in this case, if the current time is greater than the value obtained by adding the margin of the reception interval to the assumed next reception time, the unauthorized event occurrence detection unit 130 changes each of the values in the reference fields of all the data frames determined to conform to the data variation rule to 1.

If, among the data frames each having the ID for determination in the reception log stored in the reception log holding unit 180, a plurality of data frames each having a value of 1 in the reference field are present, the unauthorized event occurrence detection unit 130 makes determination based on the above-described reception interval rule and data variation rule by using, as a reference, each of the data frames having a value of 1 in the reference field. If the data frame conforms to the reception interval rule and conforms to the data variation rule by using any one of the references and if the current time is greater than the value obtained by adding the margin of reception interval to the assumed next reception time, the unauthorized event occurrence detection unit 130 changes the value in the reference field of the data frame to 1.

However, if, among the data frames of the ID for determination, no data frame having a value of 1 in the reference field in the reception log stored in the reception log holding unit 180 is present, that is, if a data frame of the ID is received for the first time, the unauthorized event occurrence detection unit 130 sets the value in the reference field for the data frame received for the first time to 1.

The group setting unit 140 sets up one or more groups each including at least some of the plurality of data frames on the basis of the frame information included in the reception log stored in the reception log holding unit 180 (a grouping step).

Setup of one or more groups by the group setting unit 140 is made if a plurality of data frames for which the values in the reference fields are set to 1 are present in the reception log of the reception log holding unit 180, that is, if it is determined that an unauthorized event has occurred. The group set for a data frame is indicated by the value in the group field of the reception log.

However, if a plurality of data frames for which the values in the reference fields are set to 1 are not present, the group setting unit 140 does not set up a group. That is, the value of the group field of the reception log remains an initial value of 0, that is, the group is not set up.

In the example illustrated in FIG. 5, the value indicating a group that is set for all the data frames is the initial value "0". The value 0 indicates that setup of a group is not performed for the data frame because, as a result of the determination made by the unauthorized event occurrence detection unit 130, the data frames each having the ID does not suggest the occurrence of an unauthorized event up to this point.

Alternatively, if the data values included in the plurality of data frames for which the values in the reference fields are set to 1 are all the same, the group setting unit 140 does not set up any group. Accordingly, the values in the group fields of the reception log stored in the reception log holding unit 180 are the initial value of 0. In addition, for example, instead of the condition that the data values included in the plurality of data frames are all the same, the condition that the values in particular subfields of the data frames are all the same or the variation of the value in the entire data field or a particular subfield of the data frame is within a predetermined range may be employed as the condition for not setting a group. Note that in the description below, the condition that the data values are all the same can be replaced with these conditions as long as there is no contradiction.

If there are a plurality of data frames for which the values in the reference fields are set to 1 and for which the values in the group fields are all the initial value of 0 (any group is not set) and if the data values of the data frames differ from one another, the group setting unit 140 classifies the plurality of data frames for which the values in the reference fields are set to 1 into different groups.

More specifically, the group setting unit 140 defines, as an assumed previous reception time, a value obtained by subtracting the average of the reception intervals between the data frames stored in the rule holding unit 190 from the reception time of the data frame for which the value in the reference field is set to 1. Thereafter, from among the data frames recorded in the reception log, the group setting unit 140 selects, as the previous reference frame, the one having the value of reception time that is greater than or equal to a value obtained by subtracting the margin of the reception interval of the data frame stored in the rule holding unit 190 from the assumed previous reception time and less than a value obtained by adding the margin of the data frame reception interval from the assumed previous reception time is defined as the previous reference frame. If a plurality of previous reference frames are found and if the groups set for these previous reference frames differ from one another, the group setting unit 140 selects, from among the plurality of previous reference frames, the one having a data value closest to the data value of the data frame for which the value in the reference field is set to 1 and sets a group that is the same as the group of the selected previous reference frame for the data frame.

At this time, the group setting unit 140 sets different groups for a plurality of data frames for which the values in the reference fields are set to 1. For example, assume that there are two data frames used as the previous reference. One of the two data frames is included in group 1 and has a data value of D1, and the other is included in group 2 and has a data value of D2. Furthermore, there are two data frames that are set as the data frames used as the current references, and the data values of the two frames are X and Y.

Then, if D1 is the closest value for both X and Y, a group is set for each of the data frames on the basis of the result of comparison of the calculation results of the following two expressions:

$$(D1-X)^2+(D2-Y)^2 \quad (1), \text{ and}$$

$$(D1-Y)^2+(D2-X)^2 \quad (2).$$

More specifically, if the value computed in expression (1) is less than the value computed in expression (2), the data frame having a data value of X is set so as to be included in group 1, and the data frame having a data value of Y is set so as to be included in group 2. However, if the value computed in expression (2) is less than the value computed in expression (1), the data frame having a data value of X is set so as to be included in group 2, and the data frame having a data value of Y is set so as to be included in group 1. As a result, setup is made such that a previous reference frame and the data frame for which the occurrence of an unauthorized event is to be determined that make the square error between their data values minimum are in the same group.

When a plurality of previous reference frames that are classified into different groups exist and if a plurality of data frames having the same data value are received, the group setting unit 140 sequentially sets group 1, group 2 . . . for the plurality of data frames in order of reception time. Thereafter, if the number of data frames included in each of the set groups reaches a predetermined number (for example, 20), the group setting unit 140 sends a notification to the unauthorized data identifying unit 150.

The unauthorized data identifying unit 150 calculates, for each of the groups, the reception interval between the data frames for which the frame information is recorded in the reception log held by the reception log holding unit 180. Thereafter, the unauthorized data identifying unit 150 identifies a group including an unauthorized data frame on the basis of the normal model held by the normal model holding unit 191 and the calculated reception interval.

FIG. 6 illustrates an example of the data structure of the normal model held by the normal model holding unit 191 of the monitoring ECU 100. The normal model illustrated in FIG. 6 indicates the variance of the reception intervals of the normal data frames having an ID of 0x100. The variance is statistically obtained as the property of normal data frames. That is, this example indicates that the variance of the reception intervals is 250000 as the property of a normal data frames having an ID of 0x100. The variance indicated by the normal model is an example of the property of the data frames according to the present embodiment.

The unauthorized data identifying unit 150 calculates the reception interval for each of the groups from the reception times recorded in the reception log and further calculates the variance of the reception intervals (a feature calculation step). The variance of the reception intervals is an example of the feature relating to the distribution of reception intervals between data frames according to the present embodiment. Subsequently, the unauthorized data identifying unit 150 identifies, as a group of normal data frames, that is, a group not including an unauthorized data frame, the group having the calculated variance closest to the variance indicated by the normal model (an unauthorized data presence determination step). In addition, the unauthorized data identifying unit 150 changes the value in the reference field of the reception log for the most recent data frame included in the normal data frame group to 1.

Upon receipt of the notification of the occurrence of unauthorized event from the unauthorized event occurrence detection unit 130, the unauthorized event handling unit 160 requests the frame generation unit 170 to generate a data frame in order to notify other ECUs of the occurrence of an unauthorized event.

Upon receipt of the request for generating a data frame from the unauthorized event handling unit 160, the frame generation unit 170 generates a data frame used to notify that an unauthorized data frame is being received and requests the frame transceiver unit 110 to transmit the generated data frame.

The reception log holding unit 180 holds the reception log described above with reference to the example illustrated in FIG. 5.

The rule holding unit 190 stores the reception interval rule and the data variation rule prescribed for each of the data frame IDs. More specifically, the reception interval rule is a rule relating to a reception interval, that is, the rule indicating the average reception interval and a margin of a reception interval between data frames. More specifically, the data variation rule is a rule relating to a margin of a variation of the data included in a data frame. FIG. 7 illustrates an example of the data structure for the rules held by the rule holding unit 190 of the monitoring ECU 100. The example in FIG. 7 illustrates the rules applied to data frames each having an ID of 0x100 and includes the reception interval rule and the data variation rule.

According to the example of the reception interval rule, the average of the reception intervals should be 50,000 µs, and the margin of the reception interval should be 3,000 µs.

In addition, according to the data variation rule, the margin of the data variation is 100. If the data value included in a data frame having an ID of 0x100 represents the vehicle speed, the data variation rule states that the absolute value of the difference between the data values of two consecutive data frames should be 1 km/h or lower. However, the note written in parentheses in the data variation margin field is only for convenience of description, and the note need not be included in the actual data variation rule.

The normal model holding unit 191 stores the above-described normal model described above with reference to the example illustrated in FIG. 6.

In the microcontroller included in the monitoring ECU 100, these functional constituent elements are provided by the processor that processes a data frame received via the communication circuit, executes the program stored in the memory and, if necessary, stores data generated in the middle or at the end of the processing in the memory.

1.5 Processing Performed by Monitoring ECU

Figure 8:
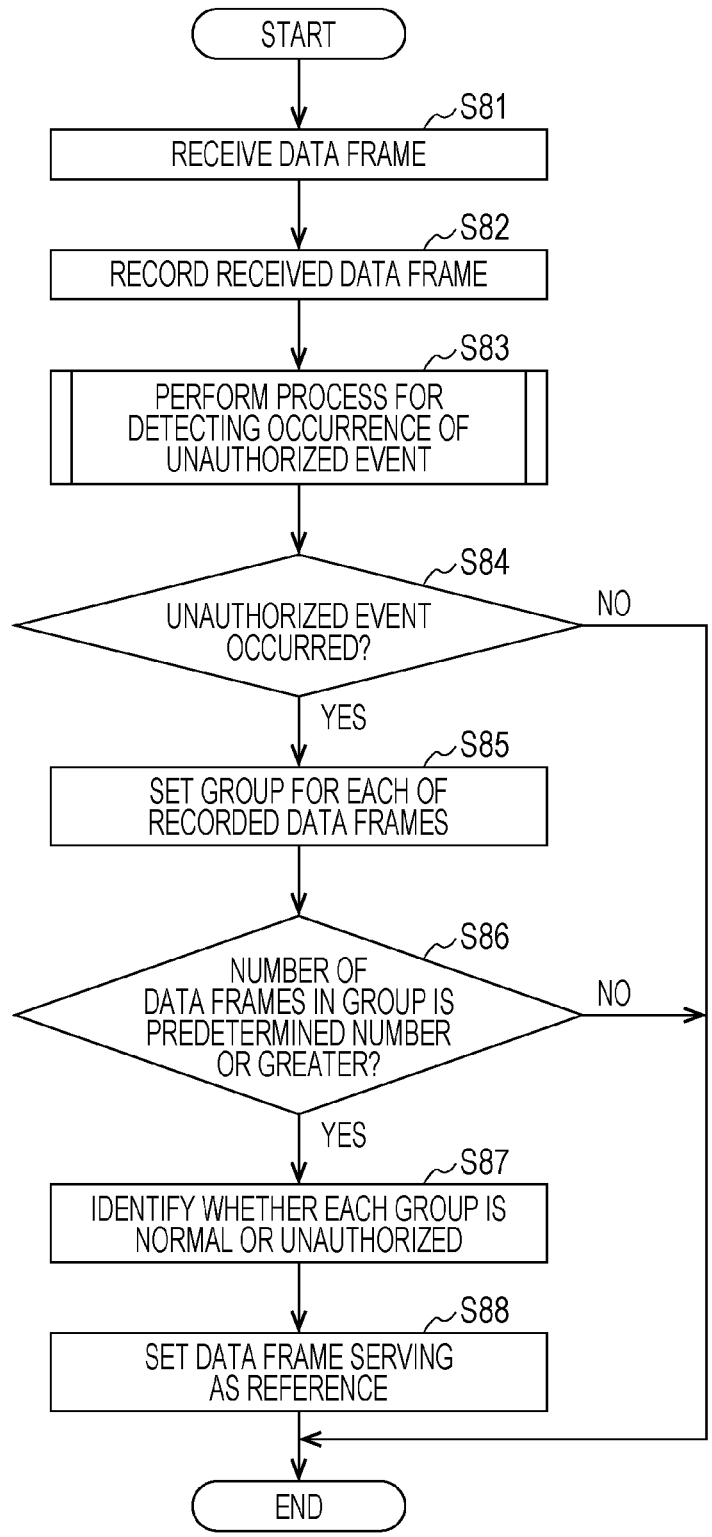
FIG. 8 is a flowchart illustrating the processing performed by the monitoring ECU according to the embodiment.

FIG. 8 is a flowchart illustrating the processing performed by the monitoring ECU 100 according to the present embodiment.

(Step S81) The frame transceiver unit 110 of the monitoring ECU 100 receives a data frame flowing in the network (the receiving step).

(Step S82) The frame collection unit 120 of the monitoring ECU 100 records, in the reception log held by the reception log holding unit 180, the frame information about the data frame received in step S81 (the frame collection step).

(Step S83) The unauthorized event occurrence detection unit 130 of the monitoring ECU 100 determines whether an unauthorized event has occurred by using the reception log held by the reception log holding unit 180 and the reception interval rule held by the rule holding unit 190 (the unauthorized event occurrence detection step). The process for the determination is described in detail below.

(Step S84) If an unauthorized event has occurred (the determination is YES), the processing performed by the monitoring ECU 100 proceeds to step S85. However, if an unauthorized event has not occurred (the determination is NO), the monitoring ECU 100 completes the processing.

(Step S85) The group setting unit 140 of the monitoring ECU 100 sets one or more groups for a plurality of data frames whose frame information is recorded in the reception log held by the reception log holding unit 180 (the grouping step).

(Step S86) For each of the groups set by the group setting unit 140, the group setting unit 140 of the monitoring ECU 100 determines whether the number of data frames included in the group is greater than or equal to a predetermined number (for example, 20). If the number of data frames included in the group is greater than or equal to the predetermined number (the determination is YES), the processing performed by the monitoring ECU 100 proceeds to step S87. However, if a group including less than the predetermined number of data frames (the determination is NO) is found, the monitoring ECU 100 completes the processing.

(Step S87) By using the reception interval of the data frame recorded in the reception log and the normal model held by the normal model holding unit 191, the unauthorized data identifying unit 150 of the monitoring ECU 100 determines whether each of the groups set by the group setting unit 140 is a normal data frame group or an unauthorized data frame group (the feature acquisition step, the unauthorized data presence/absence determination step).

(Step S88) The unauthorized data identifying unit 150 of the monitoring ECU 100 performs setting such that the value in the reference field of the reception log for a data frame to be used as a reference is set to 1 and the value for a data frame not to be used as a reference is set to 0 on the basis of the result in step S87 (a reference data frame resetting step).

1.6 Processing Performed by Unauthorized Event Occurrence Detection Unit

Figure 9:
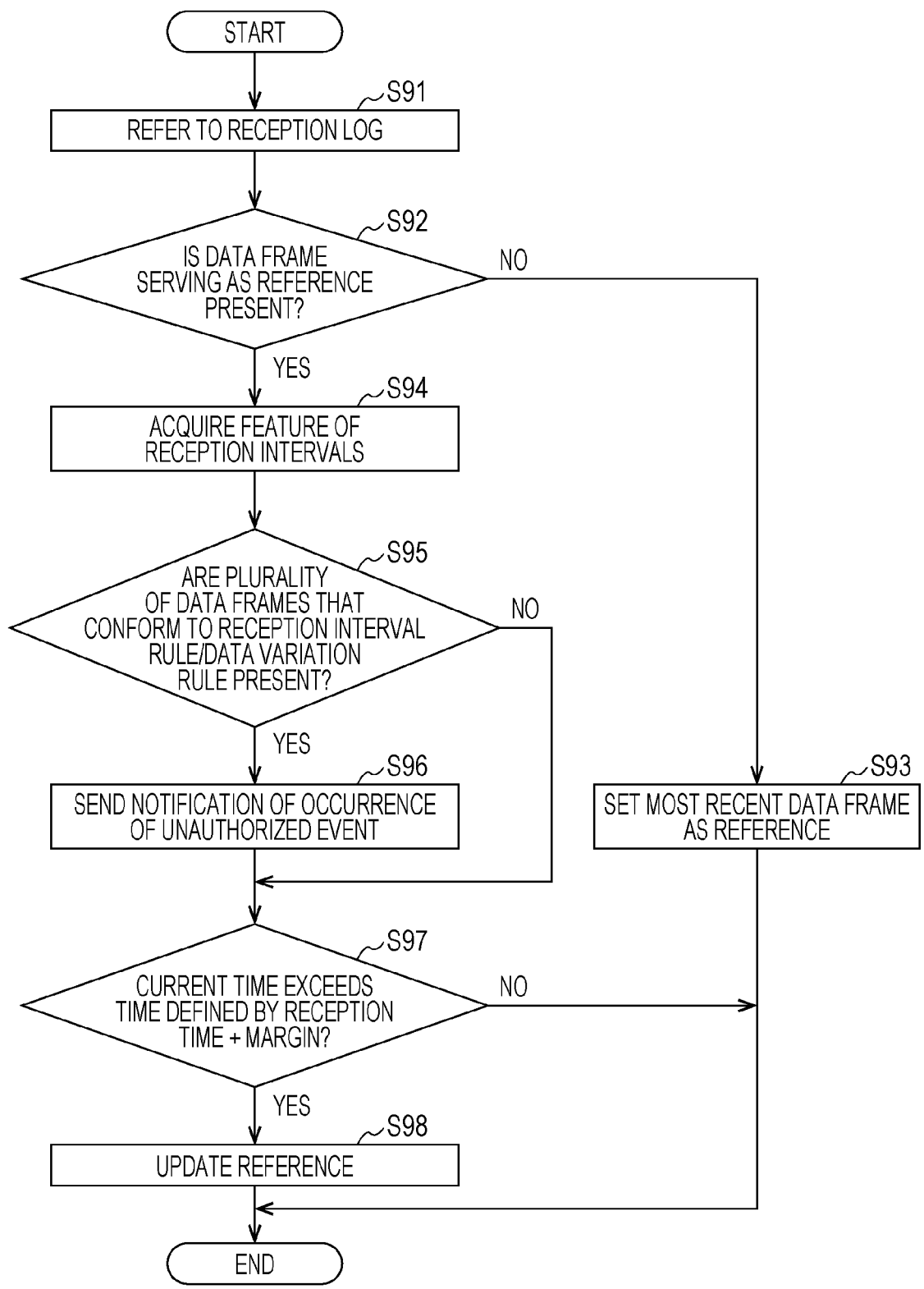
FIG. 9 is a flowchart illustrating a particular example of the process performed by an unauthorized event occurrence detection unit of the monitoring ECU according to the present embodiment.

FIG. 9 is a flowchart illustrating a particular example of the process performed by the unauthorized event occurrence detection unit 130 of the monitoring ECU 100 in step S83 according to the present embodiment.

(Step S91) The unauthorized event occurrence detection unit 130 refers to the reception log held by the reception log holding unit 180 (a reception log reference step).

(Step S92) The unauthorized event occurrence detection unit 130 determines whether a data frame for which the value in the reference field is set to 1 is present in the reception log (the reference data frame presence/absence determination step). If a data frame for which the value in the reference field is set to 1 is present, the processing performed by the unauthorized event occurrence detection unit 130 proceeds to step S94. However, if no data frame for which the value in the reference field is set to 1 is present, the process in step S93 is performed by the unauthorized event occurrence detection unit 130.

(Step S93) The unauthorized event occurrence detection unit 130 sets a value of 1 in the reference field of the most recent data frame among the data frames recorded in the reception log held by the reception log holding unit 180 (a reference data frame setting step).

(Step S94) The unauthorized event occurrence detection unit 130 acquires the reception interval and the data variation between the received data frames from the frame information included in the reception log (a reception interval/data variation acquisition step).

(Step S95) The unauthorized event occurrence detection unit 130 uses the reception interval and the data variation acquired in step S94 and determines whether a plurality of data frames that conform to the reception interval rule and the data variation rule held by the rule holding unit 190 are recorded in the reception log held by the holding unit 180 (a rule compliance determination step). At this time, if a plurality of data frames for which the values in the reference fields of the reception log are set to 1 are present, the unauthorized event occurrence detection unit 130 determines whether each of the data frames for which the values in the reference fields are set to 1 conforms to all of the rules. If the unauthorized event occurrence detection unit 130 determines that the data frame conforms to both of the reception interval rule and the data variation rule, the unauthorized event occurrence detection unit 130 determines that the data frame conforms to the rule. If there are a plurality of data frames that conform to the rule, the processing performed by the unauthorized event occurrence detection unit 130 proceeds to step S96. However, if no data frame or only one data frame that conforms to the rules is present, the processing performed by the unauthorized event occurrence detection unit 130 proceeds to step S97.

(Step S96) The unauthorized event occurrence detection unit 130 determines that an unauthorized event has occurred and notifies the unauthorized event handling unit 160 and the group setting unit 140 of the occurrence of unauthorized event.

(Step S97) The unauthorized event occurrence detection unit 130 determines whether the current time exceeds a time obtained by adding the corresponding average of the reception intervals and margin of the reception interval held by the rule holding unit 190 to the reception time of the data frame for which the value in the reference field is set to 1.

(Step S98) If the current time exceeds the time, the unauthorized event occurrence detection unit 130 changes the values in the reference fields in the reception log for all the data frames that conform to the rule to 1. However, if the current time does not exceed the time, the values in the reference fields for all the data frames remain unchanged.

1.10 Configuration of Other ECUs

Figures 10, 11:
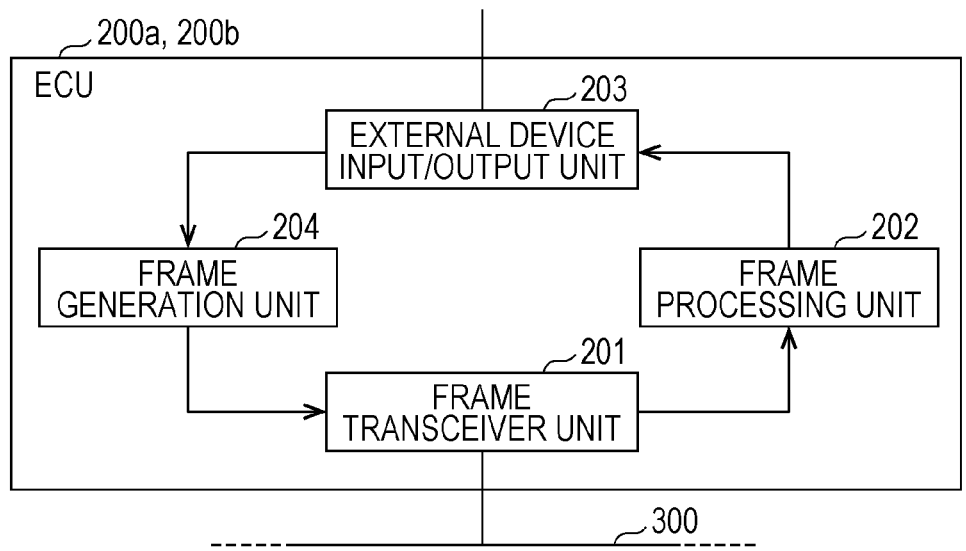
FIG. 10 is a block diagram illustrating the functional configuration of an ECU which is an example of a node connected to the in-vehicle network according to the present embodiment.
FIG. 11 illustrates an example of a data frame transmitted to a bus by the ECU according to the embodiment.

FIG. 10 is a block diagram illustrating the functional configuration of the ECU 200a or the ECU 200b which is an example of a node connected to the in-vehicle network. The functional configuration of the ECU 200b may be the same as that of the ECU 200a.

The ECU 200a includes a frame transceiver unit 201, a frame processing unit 202, an external device input/output unit 203, and a frame generation unit 204. These functional constituent elements are achieved by a communication circuit, a processor that executes a control program stored in the memory, a digital circuit, or the like in the ECU 200a.

The frame transceiver unit 201 transmits and receives, to and from the bus 300, a data frame according to the CAN protocol. That is, the frame transceiver unit 201 receives a data frame from the bus 300 bit by bit. In addition, upon completion of reception of a data frame without any error, the frame transceiver unit 201 transfers the ID, DLC, and data field (the data value) included in the data frame to the frame processing unit 202.

If the frame transceiver unit 201 determines that the received data frame does not conform to the CAN protocol, the frame transceiver unit 201 transmits an error frame. In addition, if the frame transceiver unit 201 receives an error frame from another node, the frame transceiver unit 201 discards the data frame currently being received.

The frame transceiver unit 201 further performs a process according to the CAN protocol, such as communication arbitration.

The frame processing unit 202 interprets the information in the received data frame. For example, the ECU 200b interprets the information about the speed, which is measured by the speed sensor 210, included in the data field of the data frame transmitted from the ECU 200a. Thereafter, the frame processing unit 202 notifies the external device input/output unit 203 of control information to be used by the meter 220 to display the speed information obtained through interpretation.

The external device input/output unit 203 communicates with an external device connected to the ECU 200a or the ECU 200b. For example, in the case of the ECU 200a, the external device input/output unit 203 is connected to the speed sensor 210. The external device input/output unit 203 acquires the current vehicle speed information and notifies the frame generation unit 204 of the information. In the case of the ECU 200b, the external device input/output unit 203 is connected to the meter 220. The external device input/output unit 203 transmits a signal to instruct the meter 220 to display the information so that the driver is notified of the current speed of the vehicle.

The frame generation unit 204 generates a data frame to be transmitted to the bus 300. For example, the ECU 200a generates, at predetermined intervals (for example, at 50-ms intervals), a data frame that includes the information about the vehicle speed acquired by the speed sensor 210 and received from the external device input/output unit 203. The ECU 200a transmits the generated data frame to the frame transceiver unit 201.

Note that the intervals at which data frames are generated are not limited to the above-mentioned 50-ms intervals. The intervals may be any intervals other than the 50-ms intervals.

1.11 Data Frame Transmitted by ECU

The structure of a data frame transmitted from each of the ECUs connected to the in-vehicle network according to the present embodiment is described with reference to examples. FIG. 11 illustrates an example of a data frame transmitted to the bus 300 by the ECU 200a. The monitoring ECU 100 and the ECU 200b receive the data frame from the bus 300. Note that, in FIG. 11, only the portions necessary for understanding the present embodiment are selected and illustrated.

As illustrated in FIG. 11, the ECU 200a transmits a data frame having an ID of 0x100 and a DLC of 2. The data field has a 2-byte data length, which is indicated by the DLC. The entire data field indicates the speed (given in units of 0.01 km/h). The value "0x154B" in the data field illustrated in FIG. 11 as an example indicates a vehicle speed of 54.51 km/h.

1.12 Particular Example of Processing Performed by Monitoring ECU

Subsequently, a particular example of a series of processes related to reception of the data frame by the monitoring ECU 100 is described below (refer to FIGS. 8 and 9).

Figures 12A, 12B:
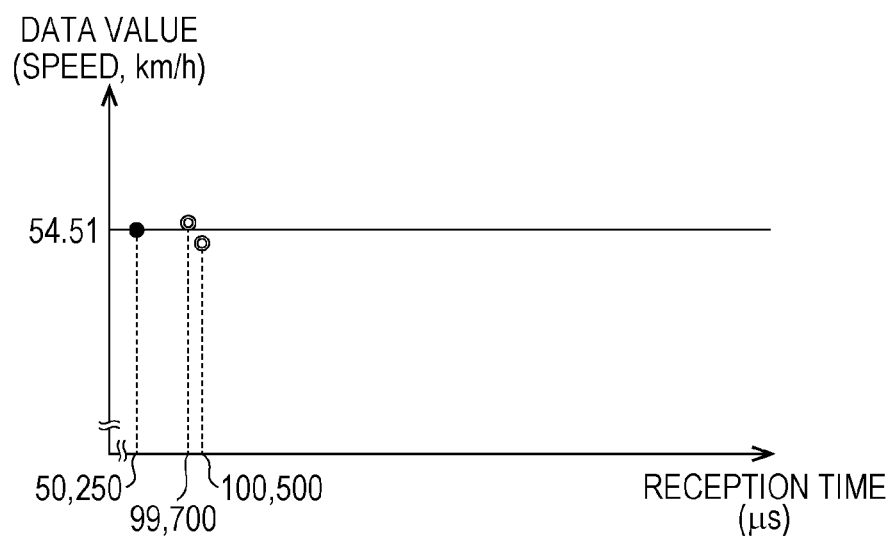
FIG. 12A illustrates another example of the reception log held by the reception log holding unit of the monitoring ECU according to the embodiment.
FIG. 12B is a diagram explaining a data frame received by the monitoring ECU according to the embodiment.
Figures 13A, 13B:
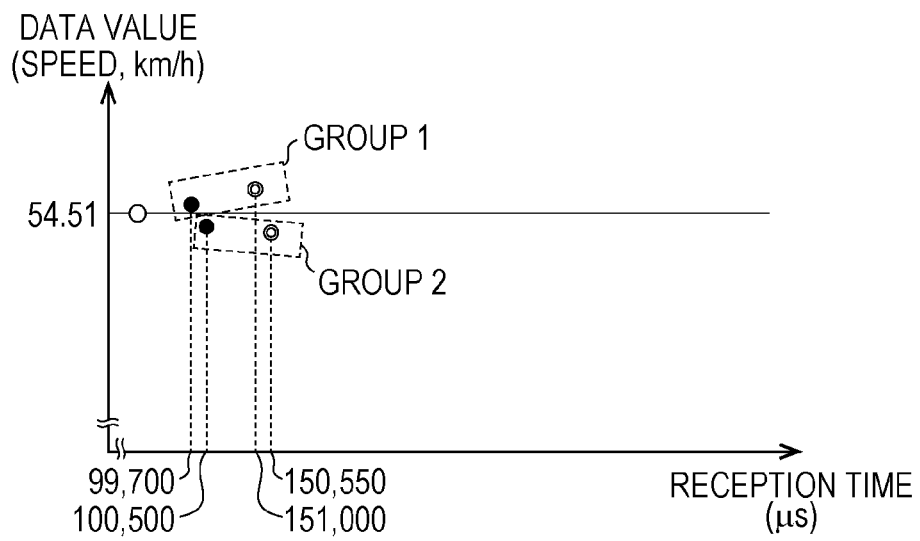
FIG. 13A illustrates another example of a reception log held by the reception log holding unit of the monitoring ECU according to the embodiment.
FIG. 13B is a diagram explaining a data frame received by the monitoring ECU according to the embodiment.
Figures 14A, 14B, 15:
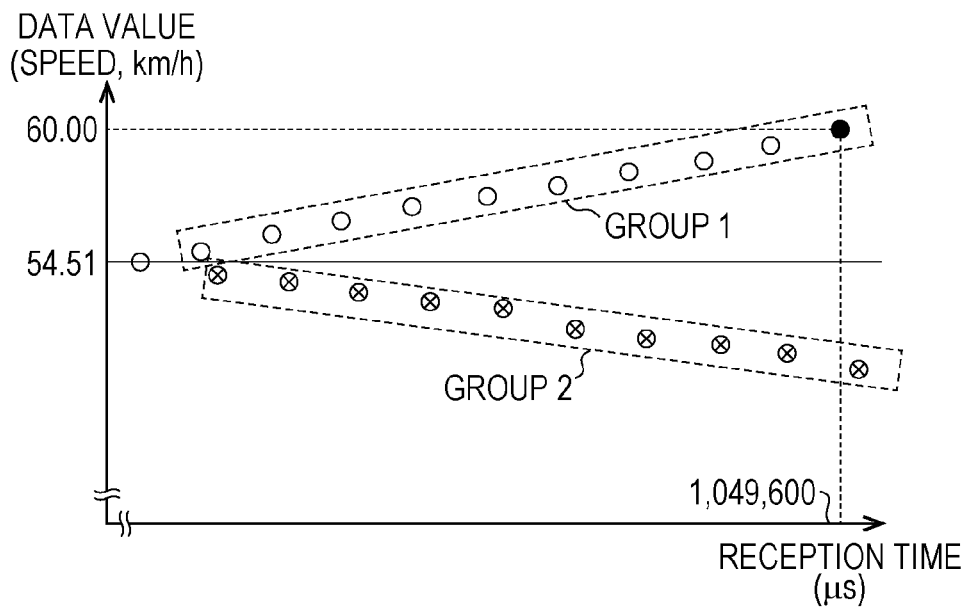
FIG. 14A illustrates another example of a reception log held by the reception log holding unit of the monitoring ECU according to the embodiment.
FIG. 14B is a diagram explaining a data frame received by the monitoring ECU according to the embodiment.
FIG. 15 illustrates the variance of reception intervals of each of groups set by the monitoring ECU according to the embodiment.

FIG. 12A, FIG. 13A, and FIG. 14A illustrate examples of the reception logs held by the reception log holding unit 180 of the monitoring ECU 100 according to the embodiment. The examples differ from the example illustrated in FIG. 5 and are given in chronological order. Note that the speed in decimal set forth in the data value field is provided for convenience of description and does not necessarily have to be included in the data value of the actual reception log.

FIG. 12B, FIG. 13B, and FIG. 14B are diagrams for explaining data frames received by the monitoring ECU 100 according to the present embodiment. FIG. 12B, FIG. 13B, and FIG. 14B correspond to FIG. 12A, FIG. 13A, and FIG. 14A, respectively. The circles in the graph space illustrated in FIG. 12B are plotted on the basis of the reception time and data value of each of the data frames recorded in the reception log illustrated in FIG. 12A. Similarly, the circles in the graph space illustrated in FIG. 13B are plotted on the basis of the reception time and data value of each of the data frames in FIG. 13A, and the circles in the graph space illustrated in FIG. 14B are plotted on the basis of the reception time and data value of each of the data frames in FIG. 14A.

FIG. 15 illustrates the variance of reception intervals of each of the groups set by the monitoring ECU 100 according to the present embodiment.

In the following particular example, the in-vehicle network system 10 employs the reception interval rule and the data variation rule illustrated in FIG. 7 as the rules for the data frames each having an ID of "0x100" and employs the normal model illustrated in FIG. 6 as a normal model. In addition, it is assumed that an unauthorized ECU is connected to the in-vehicle network system 10 and, therefore, an unauthorized data frame is flowing from the unauthorized ECU to the bus 300.

As can be seen from FIG. 12A, the monitoring ECU 100 receives three data frames, and the three data frames are recorded in the reception log (step S81, S82). The process performed by the monitoring ECU 100 up to this point is described first.

Since a data frame used as a reference does not yet exist in the process performed immediately after reception of the first data frame, the monitoring ECU 100 sets the first data frame as a reference. That is, the determination made by the unauthorized event occurrence detection unit 130 in step S92 is "NO", and the unauthorized event occurrence detection unit 130 executes step S93 (refer to FIG. 9). As a result, the value in the reference field of the first data row of the reception log is set to 1 (not illustrated).

In addition, since the occurrence of unauthorized event has not been detected, the determination made by the monitoring ECU 100 in step S84 is NO, and the series of processes related to reception of a data frame ends (refer to FIG. 8). As a result, in the group field for the first data frame, the initial value of zero remains unchanged.

In the series of processes related to reception of the second data frame, the first received data frame is used as a reference. Therefore, the determination made by the unauthorized event occurrence detection unit 130 in step S92 is YES, and the processing proceeds to step S94 (refer to FIG. 9). The unauthorized event occurrence detection unit 130 calculates the difference in reception time and the difference in data value between the first received data frame and the second received data frame and, thereafter, determines whether the two differences conform to the reception interval rule and the data variation rule (step S95).

In this example, the difference between the reception times, that is, the reception interval is 49,450 µs, which falls within the margin (the tolerance) 3,000 µs from an average reception interval of 50,000 µs. That is, the second received data frame conforms to the reception interval rule. In addition, the difference between the data values is 0.12 km/h. Consequently, the second received data frame conforms to the data variation rule as well.

At this time, a data frame that conforms to both the reception interval rule and the data variation rule is only the second received data frame. Therefore, the determination made by the unauthorized event occurrence detection unit 130 in step S95 is NO, and the processing proceeds to step S97 (refer to FIG. 9).

In step S97, the unauthorized event occurrence detection unit 130 determines whether the current time exceeds the time obtained by adding the margin to the reception time of the first data frame. In this example, assuming that the current time is earlier than the time (NO in step S97), the first received data frame is continuously used as a reference (not illustrated).

Thereafter, the processes related to reception of the second data frame (step S84 and the subsequent steps) are performed in the same manner as for the first received data frame. Consequently, both of the values in the group fields remain the initial values of zero (not illustrated).

In the series of processes related to reception of the next third data frame, the first received data frame is again used as a reference. Therefore, the determination made by unauthorized event occurrence detection unit 130 in step S92 is YES, and the processing proceeds to step S94 (refer to FIG. 9). The unauthorized event occurrence detection unit 130 calculates the difference in reception time and the difference in data value between the first received data frame and the third received data frame (step S94) and, thereafter, determines whether the two differences conform to the reception interval rule and the data variation rule (step S95).

In this case, the reception interval is 50, 250 µs, which falls within the margin of 3,000 µs from the average reception interval of 50,000 µs. That is, the third received data frame conforms to the reception interval rule. In addition, the difference in data value is 0.11 km/h. Consequently, the third received data frame conforms to the data variation rule as well.

Referring to FIG. 12B, a greater-lesser relationship of the reception interval and a greater-lesser relationship of the data values among the three received data frames are schematically illustrated. A black circle represents the first data frame. In this example, it is determined whether, on the basis of the reception time and data value of the first data frame, each of the subsequent two data frames conforms to the two rules. As a result of determination, each of the two data frames conforms to the two rules.

At this point, the data frames that conform to both the reception interval rule and the data variation rule are two data frames, that is, the second received data frame and the third received data frame. Consequently, a determination made by the unauthorized event occurrence detection unit 130 in the next step S95 is YES and, thus, the processing proceeds to step S96, where the unauthorized event occurrence detection unit 130 notifies the group setting unit 140 and the unauthorized event handling unit 160 of the occurrence of an unauthorized event (refer to FIG. 9).

Subsequently, the unauthorized event occurrence detection unit 130 determines whether the current time exceeds the time obtained by adding the margin to the reception time of the first data frame. In this example, assuming that the current time exceeds the time (YES in step S97), each of all the data frames that conform to the rule is set as data frame to be used as a reference (step S98). That is, each of the two data frames, that is, the second received data frame and the third received data frame, is set as a data frame used as a reference (refer to the "reference" field illustrated FIG. 12A).

Subsequently, the processing performed by the monitoring ECU 100 proceeds from step S84 to step S85. In step S85, the group setting unit 140 that has received the notification indicating that an unauthorized event occurred from the unauthorized event occurrence detection unit 130 sets a group for each of a plurality of data frames recorded in the reception log by using the frame information. In this example, setup is performed such that the second received data frame and the third received data frame are included in different groups. FIG. 12A illustrates the state of the reception log at this point. The values in the group fields of the reception log illustrated in FIG. 12A indicate that the second received data frame is included in group 1 and the third received data frame is included in group 2.

Subsequently, the group setting unit 140 determines whether the number of data frames included in each of group 1 and group 2 is greater than or equal to a predetermined number (step S86, refer to FIG. 8). In this example, it is assumed that the predetermined number is 10. In this case, the determination made in step S86 is NO and, thus, the series of processes related to reception of the third data frame is completed (refer to FIG. 8).

A series of processes performed by the monitoring ECU 100 upon receipt of fourth and fifth data frames is described with reference to FIGS. 13A and 13B. However, description of processes that are common to the processes related to reception of the data frame up to the third data frame is not repeated or briefly discussed.

According to the procedure in step S95 for a fourth received data frame, both the second received data frame and third received data frame are used as a reference.

The reception interval between the fourth received data frame and the second received data frame is 50,850 µs, and the difference in data value is less than 1 km/h. In addition, the reception interval between the fourth received data frame and the third received data frame is 50,050 µs, and the difference in data value is less than 1 km/h. That is, the fourth received data frame conforms to both the reception interval rule and data variation rule. Note that in the case where, as this example demonstrates, there are a plurality of data frames each to be used as a reference, it is determined that a data frame conforms to the rules if the data frame conforms to the reception interval rule and the data variation rule with respect to at least one of the data frames used as the references.

At this point, only the fourth received data frame is a data frame that conforms to both the reception interval rule and data variation rule. Therefore, a determination made by the unauthorized event occurrence detection unit 130 in step S95 is NO, and the processing proceeds to step S97.

In the next step S97, in this example, assuming that the current time is earlier than the time (NO in step S97), each of the second and third received data frames is continuously used as a reference.

The processes in step S84 and the subsequent steps are the same as those for the second received data frame.

In the procedure in step S95 for a fifth received data frame, each of the second received data frame and the third received data frame is again used as a reference.

The reception interval between the fifth received data frame and the second received data frame is 51,300 µs, and the difference in data value is less than 1 km/h. In addition, the reception interval between the fifth received data frame and the third received data frame is 50,500 µs, and the difference in data value is less than 1 km/h. That is, the fifth received data frame conforms to both the reception interval rule and data variation rule.

Referring to FIG. 13B, a greater-lesser relationship of the reception interval and a greater-lesser relationship of the data values among the five data frames received up to this point are schematically illustrated. Black circles represent the second and third received data frames. In this example, it is determined whether, on the basis of the reception time and data value of each of the second and third received data frames, each of the subsequently received fourth and fifth data frames conforms to the two rules. As a result of determination, each of the two data frames conforms to the two rules.

At this point, the data frames that conform to both the reception interval rule and data variation rule are two data frames, that is, the fourth received data frame and the fifth received data frame. Accordingly, the determination made by the unauthorized event occurrence detection unit 130 in step S95 is YES, and the processing proceeds to step S96, where the unauthorized event occurrence detection unit 130 notifies the group setting unit 140 and the unauthorized event handling unit 160 of the occurrence of an unauthorized event (refer to FIG. 9).

In step S97, in this example, assuming that the current time exceeds the time (YES in step S97), the setting of the data frame used as a reference is updated so that each of the fourth and fifth received data frames serves as a reference (step S98, refer to the "reference" field illustrated in FIG. 13A).

The processes in step S84 and the subsequent steps are the same as those for the third received data frame. In step S85, however, the group setting unit 140 sets the group of the fourth received data frame to group 1 that is the same as the group of the second received data frame having a smaller difference in data value. In addition, the group setting unit 140 sets the group of the fifth received data frame to group 2 that is the same as the group of the third received data frame having a smaller difference in data value. As can be seen from the group field of the reception log illustrated in FIG. 13A, the fourth received data frame is included in group 1, and the fifth received data frame is included in group 2. In FIG. 13B, the data frames included in the same group are illustrated so as to be surrounded by a dotted frame.

Sixth to nineteenth received data frames are processed in the same manner as the fourth or fifth received data frame. Accordingly, the description of the process is not repeated. A series of processes performed by the monitoring ECU 100 for 20th and 21st received data frames is described below with reference to FIGS. 14A and 14B. However, description of processes that are common to the processes related to reception of the data frames up to the fifth data frame is not repeated or briefly discussed. In addition, the sixth to seventeenth received data frames are not illustrated in the reception log of FIG. 14A.

In the procedure for step S95 for the 20th and 21st received data frames, both the 18th received data frame and the 19th received data frame are used as the references.

The reception interval between the 20th received data frame and the 18th received data frame is 49,100 μs, and the difference in data value is less than 1 km/h. In addition, the reception interval between the 20th received data frame and the 19th received data frame is 48,500 μs, but the difference in data value exceeds 1 km/h. As described above, since the reception interval and the data variation for the 20th received data frame with respect to the 18th received data frame meet the criteria, it is determined that the 20th received data frame conforms to both the reception interval rule and the data variation rule.

At this point, only the 20th received data frame conforms to both the reception interval rule and data variation rule. Therefore, the determination made by the unauthorized event occurrence detection unit 130 in step S95 is NO, and the processing proceeds to step S97.

In the next step S97, in this example, assuming that the current time is earlier than the time (NO in step S97), each of the 18th received data frame and the 19th received data frame is continuously used as a reference.

The processes in step S84 and the subsequent steps are the same as those for the second or fourth received data frame.

In the procedure in step S94 for the 21st received data frame, each of the 19th received data frame and the 20th received data frame is used again as the reference.

The reception interval between the 21st received data frame and the 18th received data frame is 49,700 μs, and the difference in data value exceeds 1 km/h. In addition, the reception interval between the 21st received data frame and the 19th received data frame is 49,100 μs, but the difference in data value is less than 1 km/h. As described above, since the reception interval and the data variation for the 21st received data frame with respect to the 19th received data frame meet the criteria, the 21st received data frame conforms to both the reception interval rule and data variation rule.

At this point, the data frames that conform to both the reception interval rule and data variation rule are two data frames, that is, the 20th received data frame and the 21st received data frame. Accordingly, the determination made by the unauthorized event occurrence detection unit 130 in step S95 is YES, and the processing proceeds to step S96, where the unauthorized event occurrence detection unit 130 notifies the group setting unit 140 and the unauthorized event handling unit 160 of the occurrence of an unauthorized event (refer to FIG. 9).

In the next step S97, in this example, assuming that the current time exceeds the time (YES in step S97), the setting of a data frame used as a reference is updated so that each of the 20th and 21st data frames serves as a reference (not illustrated).

In step S84, as in the case of the third or fifth received data frame, the determination is YES.

In step S85, the group setting unit 140 sets the group of the 20th received data frame to group 1 that is the same as the group of the 18th data frame having a smaller variation of the data value. Furthermore, the group setting unit 140 sets the group of the 21st received data frame to group 2 that is the same as the group of the 19th received data frame having a smaller variation of the data value.

Subsequently, the group setting unit 140 determines whether the number of data frames included in each of group 1 and group 2 is greater than or equal to a predetermined number (step S86, refer to FIG. 8). At this point, the number of data frames included in each of the groups is 10 (refer to FIG. 14B). Therefore, the determination made by the group setting unit 140 in step S86 is YES.

Subsequently, in the monitoring ECU 100, the unauthorized data identifying unit 150 identifies whether each of the groups is a normal data frame group or an unauthorized data frame group (step S87, refer to FIG. 8). The unauthorized data identifying unit 150 calculates the variance of the reception intervals of each of the groups. FIG. 15 illustrates an example of the variance of the reception intervals calculated by the unauthorized data identifying unit 150. The unauthorized data identifying unit 150 calculates the difference between each of the variances and the variance of the reception intervals between data frames each having a normal ID of 0x100 indicated by the normal model held by the normal model holding unit 191 illustrated in FIG. 6. Thereafter, the unauthorized data identifying unit 150 compares the calculated differences with each other. In this example, the unauthorized data identifying unit 150 identifies, as a group of normal data frames, group 1 having a smaller difference between the variance thereof and the variance of the normal model, that is, the variance closer to that of the normal model. In addition, the unauthorized data identifying unit 150 identifies group 2 as a group of unauthorized data frames.

In addition, the unauthorized data identifying unit 150 changes the setting so that a data frame included in the group 2, which is a group of unauthorized data frames, is not used as a reference. That is, the value in the reference field in the reception log for a data frame included in the group 2 is set to 0 (step S88, refer to FIG. 8). In this example, for a data frame to be received next, only the most recent data frame in group 1, that is, the 20th received data frame is used as a reference. In the reference field of the reception log illustrated in FIG. 14A, a value of 1 is set for only the 20th received data frame, and a value of 0 is set for all the other data frames.

FIG. 14B is a schematic illustration of a greater-lesser relationship of the reception intervals and a greater-lesser relationship of the data values of the data frames received up to this point. The circle with a cross therein represents a data frame included in group 2 identified as a group of unauthorized data frames in step S87. The black circle represents a data frame used as a reference in step S95 of the process performed on a data frame after step S88 performed on the 21st received data frame, that is, the process performed on the 22nd received data frame.

Note that when only the 20th received data frame is used as a reference, a data frame subsequently and newly transmitted from the unauthorized ECU that has transmitted the data frame included in group 2 does not conform to at least the data variation rule. That is, since the data frame does not conform to the rule in relation to any data frame, the monitoring ECU 100 considers the data frame as an unauthorized data frame and processes the data frame.

1.13 Effect

According to the present embodiment, in the monitoring ECU 100 that monitors a data frame flowing through the in-vehicle network system 10, if a plurality of data frames that conform to a predetermined rule is present, a group is set for each of the groups on the basis of the data value included in the data frame. Thereafter, by comparing, for each of the set groups, the property (the feature) relating to the distribution of the reception intervals of the data frames with the normal model, it is identified whether the group is a group including normal data frames. As a result, a normal data frame that was previously difficult to distinguish from an unauthorized data frame can be more accurately identified as a normal data frame and, thus, the in-vehicle network can be more reliably protected.

2. Modifications

While the present disclosure has been described with reference to the above embodiment, it should be appreciated that the present disclosure is not limited to the above embodiment. The following cases are also encompassed within the present disclosure.

(1) While the above embodiment has been described with reference to an example in which one of two groups is set for each of the data frames in accordance with the data value included in the data frame, three or more groups may be used for the setting. In addition, the number of groups to be set may be dynamically changed by, for example, the group setting unit 140 in accordance with the number of data frames of the same ID received within a predetermined reception interval. In this manner, even when the number of unauthorized data frame flowing in the in-vehicle network system 10 is much greater than the number of normal data frames, the in-vehicle network system 10 can more effectively process the data frames.

In addition, while the above embodiment has been described with reference to two groups that are set at a time, only one group may be set at a time for a group of data frames that satisfy a predetermined condition, such as a condition that a rule is satisfied within a certain time length. Each time a group is set, it may be determined whether the group is a group including an unauthorized data frame.

(2) In addition, while the above embodiment has been described with reference to the example in which all the data frames each conforming to both the reception interval rule and data variation rule serve as data frames used as the references, the number of data frames used as the references may be limited to a predetermined number or less. For example, if there are three or more data frames that conform to both the reception interval rule and data variation rule, the group setting unit 140 may select, as data frames used as the references, two out of the three data frames, randomly, in order of reception, or on the basis of the difference between data values. In this manner, an increase in the amount of computation required by the unauthorized event occurrence detection unit 130 can be reduced and, thus, more stable and efficient processing can be performed.

(3) The above embodiment has been described with reference to the example in which if 20 data frames or more or 10 data frames or more are included in each of the groups, it is determined whether the group is a group including an unauthorized data frame (step S86). However, the number of data frames included in each of the groups when the unauthorized data identifying unit 150 makes the determination is not limited to the above-described numbers. The number of data frames included in each of the groups may be more than or less than the above-described number. The process of identifying a group including an unauthorized data frame can be performed at a higher speed as the number of data frames included in each of the groups decreases. However, as the number of data frames included in each of the groups increases, the group can be identified with higher accuracy. The number of data frames per group may be determined while taking into account the balance between the processing speed and the accuracy of identification required for the application, for example.

In addition, while the above embodiment has been described with reference to the example in which the number of data frames included in each of the groups is used as a condition that triggers the unauthorized data identifying unit 150 to start identifying a group including an unauthorized data frame, the condition may be a condition other than the condition using the number of data frames. For example, the unauthorized data identifying unit 150 may identify an unauthorized data frame if the difference between the averages of the data values of the data frames included in the groups exceeds a predetermined value. Alternatively, when there are three or more groups and if, for example, the largest or the smallest one among the differences between the averages of the data values of the data frames included in the groups exceeds a predetermined value, the unauthorized data identifying unit 150 may identify an unauthorized data frame.

Still alternatively, if the difference between the data values of the most recent data frames included in the groups exceeds a predetermined value, the unauthorized data identifying unit 150 may identify an unauthorized data frame.

The predetermined value used in each of the above-described cases is selected and determined so as to be within a range in which a large difference between the data values of data frames having the same ID does not adversely effect the operation of the vehicle.

In this manner, data frames can be accumulated as long as it does not affect the operation of the vehicle. Therefore, a group including an unauthorized data frame can be identified before the operation of the vehicle is affected. In addition, the identification accuracy can be improved.

In addition, although identification of a group including an unauthorized data frame is performed after the above-described start condition is satisfied, the group may not be identified as a group including an unauthorized data frame because, for example, the difference between the variances of the data frame reception intervals is smaller than a predetermined value. In such a case, data frames may be further collected and added to the group and, subsequently, the identification may be performed again.

As a result, data frames can be collected until the number of data frames reaches the number required to perform identification as to whether an unauthorized event has occurred with a desired accuracy.

(4) While the above embodiment has been described with reference to the example in which if the number of data frames included in each of the groups reaches a predetermined number, identification as to whether the group is a group including an unauthorized data frame is performed on the basis of the result of one-time comparison with the normal model, the comparison is not limited thereto.

For example, in the case where the result of one-time comparison indicates that the group includes an unauthorized data frame, a data frame is continuously received and, thereafter, the determination is repeatedly made. If it is determined that the group is unauthorized a predetermined number of times (for example, three times), the group may be identified as a group of unauthorized data frames.

In this manner, identification as to whether the group is a group including an unauthorized data frame is performed more carefully. Thus, the identification accuracy can be increased.

(5) The above embodiment has been described with reference to an example in which among data frames whose frame information is recorded in the reception log, the number of data frames included in each of the groups set by the group setting unit 140 is counted. However, the upper limit of the number of data frames included in each of the groups may be determined in advance. Each time a data frame is received, the data frames included in each of the groups may be updated by using a FIFO (First-In First-Out) buffer. As a result, the oldest data frame is automatically removed from the group, and the influence of the oldest data is reduced, which is effective for improving the accuracy of identification.

(6) While the above embodiment has been described with reference to the example in which, as a method for setting a group for a data frame, a pair of data frames that minimizes the square error between the data value of the data frame used as the previous reference and the data value of the data frame serving as the current reference is set in the same group, a method for setting a data frame in a group is not limited thereto. For example, by using the data frame used as the previous reference and the data frame used as the one before the previous reference, that is, the second previous reference, the current data value may be predicted from the difference in data value between the previous data frame for which a data group was set and the second previous data frame for which a data group was set. Thereafter, the data frame having a data value that is the closet to the predicted data value may be set in the group. Alternatively, a group may be set for a data frame by using a variety of known clustering methods, such as the K-means method or DBSCAN (Density-Based Spatial Clustering of Applications with Noise).

(7) While the above embodiment has been described with reference to the variance of reception intervals used as the feature relating to the distribution of the reception intervals, the feature is not limited thereto. For example, another amount of statistics, such as the maximum value, the minimum value, or the standard deviation of the reception intervals, may be used. In addition, while the above embodiment has been described with reference to the variance of reception intervals used as the normal model, another amount of statistics may be used as the normal model. For example, the maximum value, the minimum value, or the standard deviation of the reception intervals may be used as the normal model.

(8) According to the above-described embodiment, the group having the feature that is closer to the feature indicated by the normal model is identified as the group including a normal data frame. However, the normal model is not limited thereto. Any model that indicates the feature of a normal frame can be a normal model. For example, a data frame included in a group determined as being normal in the past or the data having a normal reception interval defined by the specification may be held by the normal model holding unit 191 as a normal model. Thereafter, the unauthorized data identifying unit 150 may calculate, as the feature relating to the distribution of the reception intervals between data frames, the anomaly score through density ratio estimation between the reception interval indicated by the data of the normal model and the reception interval of the group of the data frames to be identified. Thereafter, it may be determined whether the group is a group including an unauthorized data frame. In this case, the unauthorized data identifying unit 150 performs identification of a normal or unauthorized data frame on the basis of the anomaly score.

In this manner, it can be determined whether the group of data frames is unauthorized by using a difference in probability distribution from a normal reception interval instead of using the amount of statistics obtained from a set of reception intervals and, thus, the probability of identification increases. For example, even when only one data frame or a relatively small number of data frames are included in a group to be identified, identification of the group including a normal or unauthorized data frame can be performed more accurately by using the reception interval.

As another example of the normal model, the normal model may be a model indicating an autoregressive coefficient obtained from time series data of reception intervals between normal data frames. In this case, to identify a normal data frame, calculation is made for each of the groups to obtain a prediction error between the time series data of the reception intervals between data frames included in the group, that is, a predicted reception interval predicted from the frame information by using the autoregressive coefficient, and an actual reception interval for the most recent data frame included in the group. Thereafter, a group having the smallest prediction error may be identified as a group including a normal data frame.

In this manner, a group of normal data frames can be determined on the basis of the occurrence probability based on the time series model of the reception intervals. As a result, the probability of successful identification increases.

Alternatively, to identify a group of normal data frames, a method using machine learning may be used.

For example, the vector relating to the reception interval between the data frames included in each of the groups (hereinafter referred to as a "reception interval vector") may be subjected to dimensionality reduction using, for example, the principal component analysis or the auto encoder. Thereafter, the result of dimensionality reduction may be used. For example, when a given group includes 10 data frames, a nine-dimensional vector having nine reception intervals as elements can be used, and the vector can be subjected to dimensional reduction. Thereafter, a group of data frames with a small reconstruction error after restoration may be identified as a group including normal data frames.

Note that the reception interval vector described above may be used in a method other than the method using machine learning. For example, the reception interval rule may be a rule relating to the feature, such as the variance of a reception interval vector (a normal reception interval vector) about reception intervals between normal data frames. In this case, the unauthorized data identifying unit 150 performs identification on the basis of, for example, the difference between the variance of the normal reception interval vector indicated by the reception interval rule and the variance of the reception interval vector of the data frame to be identified.

According to another example of a method using machine learning, Random Forest or Support Vector Machine, for example, is used as a classifier that has learned, as a label of a group of an unauthorized data frame, reception interval data obtained by injecting an unauthorized data frame into the vicinity of a normal data frame in advance.

(9) According to the above-described embodiment and modifications thereof, a group including an unauthorized data frame is identified by using the feature (the feature relating to the reception intervals) calculated from the reception intervals between the data frames for each of the groups after setting a group for each of the data frames in accordance with the data value included in the data frame. However, the presence/absence of an unauthorized data frame may be determined on the basis of the feature of the distribution of the reception intervals between a plurality of data frames without setting a group for each of the data frames.

In this manner, it is possible to detect that an unauthorized data frame is being transmitted by using the reception intervals between data frames even in a situation where only unauthorized data frames are transmitted to the network without any normal data frame transmitted. Thus, the in-vehicle network can be effectively protected. This situation may occur when, for example, a normal data frame is replaced by a data frame transmitted during an attack.

In a network having a specification such as CAN, the transmission period of the data frame is substantially constant for each type (content) of data identified by the ID, and the data frame for attack needs to be transmitted within an allowable range of the period. However, the actual transmission period of the data frame varies from ECU to ECU and from process type to process type. For this reason, it is difficult for an attacker to generate a fake feature relating to the distribution of reception intervals between data frames, since the feature is statistically obtained from the samples of actually transmitted data frames. Consequently, it is difficult for attackers to evade countermeasures against attack that use the feature relating to reception intervals. As a result, the in-vehicle network can be protected more reliably.

(10) While the above embodiment has been described with reference to the example in which the monitoring ECU 100 that has detected an unauthorized event performs an operation to transmit a data frame for notifying other ECUs or the like of the occurrence of the unauthorized event, the operation is not limited thereto. For example, the monitoring ECU 100 may detect an unauthorized event while receiving a data frame and invalidate a data frame that does not conform to either the reception interval rule or the data variation rule by sending an error frame.

If the in-vehicle network includes a gateway ECU, a monitoring function equivalent to that of the monitoring ECU 100 may be added to the gateway ECU. The gateway ECU may perform an operation so as not to transfer a data frame that does not conform to the rule. In this way, by adding a monitoring function to the gateway ECU, the information about more in-vehicle networks can be monitored. As a result, the number of providable functions can be increased. In addition, efficient monitoring can be performed.

Furthermore, other examples of the operation performed by the monitoring ECU 100 that has detected an unauthorized event include notifying the user of detection of the unauthorized event, entering the fail safe mode of the vehicle, recording the unauthorized event in the log, and notifying a cloud server and the like located outside the vehicle of the detected unauthorized event via, for example, a mobile phone network.

In this manner, after the unauthorized event is detected, the user or a system that cooperates with the in-vehicle network system 10 can perform flexible processing. In addition, a group including an unauthorized data frame may be used for machine learning such that a set of frame information, such as the data value information or the reception interval information, is used as a label serving as an index of an unauthorized event.

(11) According to the above-described embodiment, a data frame serving as a reference is set up again in step S88, and the subsequent process for detecting the occurrence of an unauthorized event is performed by using the data frame as the reference (step S83). However, the processing is not limited thereto. For example, instead of performing the process in step S88, it may be determined whether each of the subsequently received data frames belongs to the group including an unauthorized data frame identified in step S87 on the basis of the data value (the data frame determination step). For example, a data frame for which the result of determination is YES may be processed as a data frame not to be transferred by the gateway.

Alternatively, in the data frame determination step, it may be determined whether each of the received data frames belongs to a group not including an unauthorized data frame (a normal data frame group) identified in step S87. For example, only the data frame for which the result of this determination is YES may be processed as a data frame to be transferred by the gateway.

In this manner, it is possible to perform filtering on the data frames by determining whether each of the data frames is normal or unauthorized.

(12) While the above embodiment has been described with reference to, as an example, the ID of the standard format of the CAN protocol, the ID may be the ID of the extended format of the CAN protocol.

(13) According to the above-described embodiment, in the reception log, the frame information about each of the data frames includes the reception time as the reception interval information, and the actual reception interval between the data frames is obtained by calculating the difference between the reception times. However, the reception log is not limited thereto. For example, in the reception log, instead of the reception time, the calculation result of the difference between the reception time of a data frame and the reception time of the immediately preceding data frame may be included as the reception interval information. In the monitoring ECU 100, the unauthorized event occurrence detection unit 130 may acquire the reception interval information which is the result of the above-described calculation and directly use the acquired reception interval information.

(14) While the above embodiment has been described with reference to use of the reception log of the data frame held for an ID of "0x100", the normal model, the reception interval rule, and the data variation rule, these pieces of information may be held for one or more IDs in the monitoring ECU 100. For example, the pieces of information may be held for each of the IDs of all data frames to be monitored.

In addition, if the specification of communication does not define a plurality of types of data frames or if it is already known that although a plurality of types are defined, the normal ranges of the reception interval and the data variation are common, the ID need not be included in the reception log.

(15) While the above embodiment has been described with reference to the example in which the data frame is sent to the bus 300 in the form of plaintext, the data frame may be encrypted and, thereafter, transmitted to the bus. In addition, a message authentication code may be included in the data frame.

(16) While the above embodiment has been described with reference to the example in which the normal model and the reception log are respectively held in the normal model holding unit 191 and the reception log holding unit 180 in the form of plaintext, the normal model and the reception log may be encrypted.

(17) While the above embodiment has been described with reference to the CAN protocol used by the in-vehicle network, the protocol is not limited thereto. For example, CAN-FD (CAN with Flexible Data-Rate), FlexRay, Ethernet (registered trademark), LIN (Local Interconnect Network), MOST (Media Oriented Systems Transport) or the like may be used. Alternatively, one of these networks that serves as a subnetwork may be combined with the CAN to form the in-vehicle network.

(18) While the above embodiment has been described with reference to the monitoring ECU 100 including, as the constituent elements, the unauthorized event occurrence detection unit 130, the group setting unit 140, the unauthorized data identifying unit 150, and the storage device that holds various types of data, all the constituent elements need not be provided in a single apparatus. For example, the unauthorized event occurrence detection unit 130, the group setting unit 140, the unauthorized data identifying unit 150, or the storage device may be provided in a cloud server located outside the vehicle. For example, in a cloud server including these constituent elements, data received from the frame collection unit 120 of the monitoring ECU 100 over a wireless communication network (e.g., a cell phone network) that allows the in-vehicle network system to connect thereto is stored in the reception log holding unit 180 provided in the storage device. In addition, the unauthorized event occurrence detection unit 130, the group setting unit 140, and the unauthorized data identifying unit 150 read the reception log stored in the reception log holding unit 180 and write reception log into the reception log holding unit 180.

In addition, when the monitoring ECU 100 receives, from the unauthorized event occurrence detection unit 130 of the cloud server, a notification of the occurrence of an unauthorized event over the wireless communication network, the unauthorized event handling unit 160 requests the frame generation unit 170 to generate a data frame.

Note that the present disclosure can be realized in the form of an information processing system including one or more information processing apparatuses according to the embodiment or the modification of the embodiment.

(19) More specifically, each of the ECUs according to the above-described embodiment is a computer system including a microprocessor, a ROM, a RAM, a hard disk unit, a display unit, a keyboard, a mouse, and the like. The RAM or the hard disk unit has a computer program recorded therein. The microprocessor operates in accordance with the computer program, so that each of the ECUs achieves the function thereof. Here, in order to achieve a predetermined function, the computer program is formed by combining a plurality of instruction codes representing instructions to the computer.

(20) Any part or the whole of the configuration of each of the ECUs according to the above-described embodiment may be composed of a single system LSI (Large Scale Integration). The system LSI is a super multifunctional LSI produced by integrating a plurality of constituent parts on one chip. More specifically, a system LSI is a computer system including, for example, a microprocessor, a ROM, and a RAM. The RAM has a computer program stored therein. The microprocessor operates in accordance with the computer program, so that the system LSI achieves the function thereof.

Furthermore, the constituent elements constituting each of the ECUs described above may be provided as individual chips, or some or all of the constituent elements may be integrated into a single chip.

Although the term "system LSI" is used to describe the configuration of each of the ECUs here, the term "system LSI" is also referred to as an "IC", an "LSI", a "super LSI" or an "ultra LSI", depending on the level of integration. In addition, the circuit integration is not limited to LSI and may be achieved by dedicated circuitry or a general-purpose processor. A field programmable gate array (FPGA), which is programmable after fabrication of the LSI, or a reconfigurable processor which allows reconfiguration of connections and settings of circuit cells in LSI may be used.

Moreover, should a circuit integration technology replacing LSI appear as a result of advancements in semiconductor technology or other technologies derived from the technology, the functional blocks could be integrated using such a technology. Another possibility is the application of biotechnology, for example.

(21) Any part or the whole of the configuration of each of the above-described ECUs may be composed of an IC card or a single module removable from the ECU. The IC card or the module is a computer system including a microprocessor, a ROM, a RAM and the like. The IC card or the module may include the above-described super multifunction LSI. The microprocessor operates in accordance with the computer program, so that the IC card or the module achieves the function thereof. The IC card or the module may be tamper resistant.

(22) The present disclosure may be a method including the steps described above. For example, the present disclosure can be realized as a method including the content of the processing performed by each of the components of the monitoring ECU 100 as a procedure. Alternatively, the present disclosure may be a computer program to implement these methods by a computer or may be a digital signal composed of a computer program.

Furthermore, the present disclosure is applicable to a computer-readable recording medium, such as a flexible disk, a hard disk, a CD-ROM, an MO, a DVD, a DVD-ROM, a DVD-RAM, a BD (Blu-ray (registered trademark) Disc), or a semiconductor memory, having a computer program or digital signals recorded therein. Still furthermore, the present disclosure may be digital signals recorded on these recording media.

Furthermore, the present disclosure may be applicable to a computer program or digital signals transmitted via an electric communication line, a wireless or wired communication line, a network represented by the Internet, a data broadcast, or the like.

Furthermore, the present disclosure is applicable to a computer system including a microprocessor and a memory. The memory may store the computer program, and the microprocessor may operate in accordance with the computer program.

Alternatively, the program or the digital signals may be recorded on a recording medium and may be transferred into another independent computer system, or the program or the digital signals may be transferred into the independent computer system via a network or the like. Thus, the program or the digital signals may be executed.

(23) The above-described embodiments and modifications may be combined in any way.

As described above, the information processing system or the like of the present disclosure described using any of the above embodiments or the modification thereof is capable of monitoring a data frame flowing in the in-vehicle network and determining the presence/absence of an unauthorized data frame on the basis of the property relating to the distribution of the reception intervals even when a plurality of data frames that conform to a rule are transmitted. In addition, by setting a group for a received data frame on the basis of the data value, obtaining, from each of the set groups, the feature relating to the distribution of reception intervals, and comparing the obtained feature with the normal model, a group of a normal data frame can be identified. In this manner, even for a plurality of data frames that conform to the rule and that were previously difficult to distinguish between a normal data frame and an unauthorized data frame, it is possible to accurately identify whether the group of the data frame is a group of a normal data frame or an unauthorized data frame, or it is possible to determine whether the plurality of received data frames include an unauthorized data frame. As a result, the in-vehicle network can be more reliably protected.

In the description of the present disclosure, the phrase "determine whether a plurality of data frames include an unauthorized data frame" is used to refer to either one of identification as to whether each of the plurality of data frames is a normal data frame or an unauthorized data frame and determination of the occurrence of an unauthorized event based on whether the plurality of data frames include at least one unauthorized data frame. In addition, while the above embodiment has been described with reference to the cyber security countermeasure in the in-vehicle network mounted in an automobile, the applicable field is not limited thereto. The above embodiment may be applied to mobility, such as a construction machine, a farm machine, a boat, a railway, and an airplane, in addition to an automobile. That is, the above-described embodiment can be applied to a mobility network and a mobility network system as a cyber security countermeasure. Furthermore, the above embodiment may be applied to communication networks used in industrial control systems in, for example, factories and buildings or communication networks for controlling embedded devices.

The present disclosure can be used for an in-vehicle network system including an in-vehicle network or the like.

What is claimed is:

1. A method, performed by a control system including a storage device, for processing a data frame flowing in a network, the method comprising:
   sequentially receiving a plurality of data frames flowing in the network;
   recording, in a reception log held in the storage device, reception interval information indicating reception intervals between the plurality of data frames as frame information;
   acquiring, from the reception interval information, a first distribution of the reception intervals between the plurality of data frames; and
   determining a presence or an absence of an unauthorized data frame among the plurality of data frames,
   wherein a normal model indicating a second distribution of normal data frames is stored in the storage device,
   wherein in the determining of the presence or the absence of the unauthorized data frame, a difference between the normal model and the first distribution of the reception intervals between the plurality of data frames is calculated, and the presence or the absence of the unauthorized data frame is determined in accordance with the difference,
   wherein the normal model indicates an amount of statistics of reception intervals between the normal data frames as the second distribution,
   wherein the first distribution is an amount of statistics of the reception intervals between the plurality of data frames, and
   wherein in the determining the presence or the absence of the unauthorized data frame, a difference between the amount of statistics of the reception intervals between the normal data frames and the amount of statistics of the reception intervals between the plurality of data frames is calculated, and whether the unauthorized data frame is present among the plurality of data frames is determined based on a magnitude of the difference.

2. The method according to claim 1, wherein the normal model further indicates reception intervals between the normal data frames as the second distribution,
   wherein the first distribution includes an anomaly score of the reception intervals between the plurality of data frames, and the anomaly score is calculated by using density ratio estimation between the reception intervals between the plurality of data frames and the reception intervals between the normal data frames indicated by the normal model, and
   wherein in the determining the presence or the absence of the unauthorized data frame, whether the unauthorized data frame is present among the plurality of data frames is further determined based on the anomaly score.

3. The method according to claim 1, wherein the normal model further indicates a variance of reception intervals between the normal data frames as the second distribution,
   wherein the first distribution includes a variance of the reception intervals between the plurality of data frames, and
   wherein in the determining the presence or the absence of the unauthorized data frame, a difference between the variance of the reception intervals between the normal data frames and the variance of the reception intervals between the plurality of data frames is calculated, and whether the unauthorized data frame is present among the plurality of data frames is further determined based on a magnitude of the difference.

4. The method according to claim 1, wherein the frame information further includes a data value included in each of the plurality of data frames in association with the reception interval information,
wherein the method further comprises setting at least one group including at least some of the plurality of data frames based on the reception interval information and each data value included in the frame information,
wherein in the acquiring the first distribution of the reception intervals between the plurality of data frames, a group distribution of the reception intervals between the plurality of data frames included in each of the at least one group is acquired from the reception interval information included in the reception log, and
wherein in the determining the presence or the absence of the unauthorized data frame, a group including the unauthorized data frame and a group not including the unauthorized data frame are identified among the at least one group based on at least the group distribution acquired for each of the at least one group.

5. The method according to claim 4, further comprising:
determining whether a data frame received after each of the at least one group is identified in the determining the presence or the absence of the unauthorized data frame is a normal data frame or the unauthorized data frame by determining whether the data frame belongs to at least one of the identified group including the unauthorized data frame or the identified group not including the unauthorized data frame.

6. The method according to claim 4, wherein the storage device further holds a reception interval rule relating to a reception interval between data frames and a data variation rule relating to a temporal variation of a data value included in a data frame,
wherein in the setting the at least one group, the at least one group is set up based on the reception interval information, the data value, the reception interval rule, and the data variation rule, and
wherein if a number of data frames included in each of the at least one group is greater than or equal to a predetermined number, the determining the presence or the absence of the unauthorized data frame is performed on the at least one group.

7. The method according to claim 6, wherein the data variation rule states that a temporal variation of the data value included in the data frame should be less than or equal to a predetermined value.

8. The method according to claim 4, wherein the storage device further holds a reception interval rule relating to a reception interval between data frames and a data variation rule relating to a temporal variation of a data value included in a normal data frame,
wherein in the setting the at least one group, a plurality of groups is set up for the plurality of data frames based on the reception interval information, the data value, the reception interval rule, and the data variation rule, and
wherein if a difference between averages of data values of data frames included in the plurality of groups is greater than or equal to a predetermined value, the determining the presence or the absence of the unauthorized data frame is performed on the plurality of groups.

9. The method according to claim 4, wherein the storage device further holds an autoregressive coefficient obtained from time-series data of reception intervals between the normal data frames,
wherein the at least one group set in the setting the at least one group comprises a plurality of groups,
wherein the first distribution of the reception intervals between the plurality of data frames included in each of the plurality of groups is a predicted reception interval predicted by using the reception interval information,
wherein in the acquiring the first distribution, the predicted reception interval is acquired as the first distribution of the reception intervals between the plurality of data frames included in each of the plurality of groups by using the autoregressive coefficient and the frame information, and
wherein in the determining the presence or the absence of the unauthorized data frame, calculation is made for each of the plurality of groups to obtain a prediction error between the predicted reception interval and an actual reception interval for a most recent data frame included in each group, and a group having a smallest prediction error among the plurality of groups is identified as the group not including the unauthorized data frame.

10. The method according to claim 4, wherein in the determining the presence or the absence of the unauthorized data frame, the group including the unauthorized data frame and the group not including the unauthorized data frame are identified among the at least one group by using a classifier that has learned a reception interval vector of a normal data frame and a reception interval vector of the unauthorized data frame.

11. The method according to claim 10, wherein the classifier is configured by using at least one of Random Forest, Support Vector Machine, Nearest Neighbor, and Neural Network.

12. A non-transitory computer-readable recording medium storing a program that causes a processor in the control system including the processor and the storage device to perform the method according to claim 1.

13. A control system for processing a data frame flowing in a network, the network including at least one electronic control unit, the control system comprising:
a processor; and
a storage device,
wherein the processor sequentially receives a plurality of data frames flowing in the network,
wherein the processor records, in a reception log held in the storage device, reception interval information indicating reception intervals between the plurality of data frames as frame information,
wherein the processor acquires, from the reception interval information, a first distribution of the reception intervals between the plurality of data frames,
wherein the processor determines a presence or an absence of an unauthorized data frame among the plurality of data frames,
wherein a normal model indicating a second distribution of normal data frames is stored in the storage device, and
in determining the presence or the absence of the unauthorized data frame by the processor, a difference between the normal model and the first distribution of the reception intervals between the plurality of data frames is calculated, and the presence or the absence of the unauthorized data frame is determined in accordance with the difference, wherein the normal model indicates an amount of statistics of reception intervals between the normal data frames as the second distribution, wherein the first distribution is an amount of statistics of the reception intervals between the plurality of data frames, and wherein in the determining the presence or the absence of the unauthorized data frame, a difference between the amount of statistics of the reception intervals between the normal data frames and the amount of statistics of the reception intervals between the plurality of data frames is calculated, and whether the unauthorized data frame is present among the plurality of data frames is determined based on a magnitude of the difference.

14. A method, performed by a control system including a storage device, for processing a data frame flowing in a network, the method comprising:

sequentially receiving a plurality of data frames flowing in the network;

recording, in a reception log held in the storage device, reception interval information indicating reception intervals between the plurality of data frames as frame information;

acquiring, from the reception interval information, a first distribution of the reception intervals between the plurality of data frames; and determining a presence or an absence of an unauthorized data frame among the plurality of data frames, wherein a normal model indicating a second distribution of normal data frames is stored in the storage device, wherein in the determining of the presence or the absence of the unauthorized data frame, a difference between the normal model and the first distribution of the reception intervals between the plurality of data frames is calculated, and the presence or the absence of the unauthorized data frame is determined in accordance with the difference, wherein the normal model indicates reception intervals between the normal data frames as the second distribution, wherein the first distribution is an anomaly score of the reception intervals between the plurality of data frames, and the anomaly score is calculated by using a probability distribution between the reception intervals between the plurality of data frames and the reception intervals between the normal data frames indicated by the normal model, and wherein in the determining the presence or the absence of the unauthorized data frame, whether the unauthorized data frame is present among the plurality of data frames is determined based on the anomaly score.

15. A method, performed by a control system including a storage device, for processing a data frame flowing in a network, the method comprising:

sequentially receiving a plurality of data frames flowing in the network;

recording, in a reception log held in the storage device, reception interval information indicating reception intervals between the plurality of data frames as frame information;

acquiring, from the reception interval information, a feature relating to distribution of the reception intervals between the plurality of data frames; and determining a presence or an absence of an unauthorized data frame among the plurality of data frames, wherein a normal model indicating a property of a normal data frame is further stored in the storage device, wherein the normal model indicates reception intervals between normal data frames as the property, wherein the acquired feature is an anomaly score of the reception intervals between the plurality of data frames, and the anomaly score is calculated by using a probability distribution between the reception intervals between the plurality of data frames and the reception intervals between the normal data frames indicated by the normal model, and wherein in the determining the presence or the absence of the unauthorized data frame, the presence or the absence of the unauthorized data frame among the plurality of data frames is determined by using the feature acquired by using the reception interval information, the normal model, and the anomaly score.

* * * * *